(12) United States Patent
Megretski et al.

(10) Patent No.: US 10,992,326 B1
(45) Date of Patent: Apr. 27, 2021

(54) BUFFER MANAGEMENT FOR ADAPTIVE DIGITAL PREDISTORTION

(71) Applicant: NanoSemi, Inc, Waltham, MA (US)

(72) Inventors: Alexandre Megretski, Concord, MA (US); Yan Li, Lexington, MA (US); Zohaib Mahmood, Westwood, MA (US); Kevin Chuang, Cambridge, MA (US); Helen H. Kim, Sudbury, MA (US)

(73) Assignee: NanoSemi, Inc., Waltham, MA (US)

( * ) Notice: Subject to any disclaimer, the term of this patent is extended or adjusted under 35 U.S.C. 154(b) by 0 days.

(21) Appl. No.: 16/877,606

(22) Filed: May 19, 2020

(51) Int. Cl.
   *H04B 1/04* (2006.01)
(52) U.S. Cl.
   CPC ... *H04B 1/0475* (2013.01); *H04B 2001/0425* (2013.01)
(58) Field of Classification Search
   CPC .................... H04B 1/0475; H04B 1/04; H04B 2001/0408; H04B 2001/0425
   See application file for complete search history.

(56) References Cited

U.S. PATENT DOCUMENTS

| | | |
|---|---|---|
| 4,979,126 A | 12/1990 | Pao et al. |
| 5,819,165 A | 10/1998 | Hulkko et al. |
| 5,980,457 A | 11/1999 | Averkiou |
| 6,052,412 A | 4/2000 | Ruether et al. |
| 6,240,278 B1 | 5/2001 | Midya et al. |
| 6,288,610 B1 | 9/2001 | Miyashita |

(Continued)

FOREIGN PATENT DOCUMENTS

| | | |
|---|---|---|
| CN | 101379718 A | 3/2009 |
| CN | 101971507 A | 2/2011 |

(Continued)

OTHER PUBLICATIONS

Cheng, Sheng-Lung, Wen-Rong Wu, Chun-Hsien Peng, Chen-Jui Hsu, and Paul Liang. "Digital predistortion for concurrent dual-band transmitter using a 2D LUT based method." in 2015 IEEE 16th Annual Wireless and Microwave Technology Conference (WAMICON), pp. 1-4. IEEE, 2015.

(Continued)

*Primary Examiner* — Nguyen T Vo
(74) *Attorney, Agent, or Firm* — Occhiuti & Rohlicek LLP (57) ABSTRACT

Disclosed are implementations, including a method comprising selecting a location of a selection buffer (that stores observed output samples produced by a signal chain) according to a pseudo-random buffer selection process, and accessing at least one observed output sample generated in response to corresponding input samples (to the system) and/or intermediary samples (outputs of a digital compensator) produced by a compensator of the system. The method further includes computing an approximation of a sub-gradient value computed according to a stochastic gradient process to derive a sub-gradient of an error function representing a relationship between the observed output sample, and the input and/or intermediary samples, computing updated values for the compensator coefficients based on current values of the coefficients and the approximation of the sub-gradient value, and replacing, at a time instance determined independently of the buffer selection process, content of part or all of the selection buffer.

20 Claims, 3 Drawing Sheets

(56) References Cited

U.S. PATENT DOCUMENTS

| | | |
|---|---|---|
| 6,549,067 B1 | 4/2003 | Kenington |
| 7,289,773 B2 | 10/2007 | Braithwaite |
| 7,295,815 B1 | 11/2007 | Wright et al. |
| 7,321,264 B2 | 1/2008 | Kokkeler |
| 7,333,557 B2 | 2/2008 | Rashev et al. |
| 7,469,491 B2 | 12/2008 | McCallister et al. |
| 7,529,652 B1 | 5/2009 | Gahinet et al. |
| 7,577,211 B2 | 8/2009 | Braithwaite |
| 7,599,431 B1 | 10/2009 | Anderson et al. |
| 7,634,238 B2 | 12/2009 | Suzuki et al. |
| 7,796,960 B1 | 9/2010 | Rashev et al. |
| 7,904,033 B1 | 3/2011 | Wright et al. |
| 8,121,560 B1* | 2/2012 | Anaraki ............... H03F 1/3241 455/114.3 |
| 8,185,066 B2 | 5/2012 | Camp, Jr. et al. |
| 8,306,149 B2 | 11/2012 | Mujica et al. |
| 8,391,809 B1 | 3/2013 | Fuller |
| 8,411,730 B2 | 4/2013 | Maeda |
| 8,446,979 B1 | 5/2013 | Yee |
| 8,498,590 B1 | 7/2013 | Rashev et al. |
| 8,519,789 B2 | 8/2013 | Hawkes |
| 8,576,941 B2 | 11/2013 | Bai |
| 8,644,437 B2 | 2/2014 | Kim et al. |
| 8,666,336 B1 | 3/2014 | Dick |
| 8,711,976 B2 | 4/2014 | Chandrasekaran |
| 8,731,005 B2 | 5/2014 | Schlee |
| 8,731,105 B2 | 5/2014 | Bai |
| 9,071,207 B2 | 6/2015 | Bai |
| 9,130,628 B1 | 9/2015 | Mittal et al. |
| 9,173,173 B2 | 10/2015 | Wei et al. |
| 9,184,710 B2 | 11/2015 | Braithwaite |
| 9,226,189 B1 | 12/2015 | Kularatna et al. |
| 9,252,712 B2 | 2/2016 | Li et al. |
| 9,331,882 B2 | 5/2016 | Fehri et al. |
| 9,337,782 B1 | 5/2016 | Mauer et al. |
| 9,564,876 B2 | 2/2017 | Kim et al. |
| 9,590,668 B1 | 3/2017 | Kim et al. |
| 9,595,920 B2 | 3/2017 | Li et al. |
| 9,614,557 B1 | 4/2017 | Mayer et al. |
| 9,621,236 B2 | 4/2017 | Ghannouchi et al. |
| 9,628,119 B2 | 4/2017 | Gal et al. |
| 9,722,646 B1 | 8/2017 | Matthews et al. |
| 9,749,161 B1 | 8/2017 | Gal et al. |
| 9,935,810 B1 | 4/2018 | Hammler et al. |
| 9,973,370 B1 | 5/2018 | Langer et al. |
| 10,033,413 B2 | 7/2018 | Pratt |
| 10,033,414 B2 | 7/2018 | Ota |
| 10,079,699 B1 | 9/2018 | Li et al. |
| 10,080,178 B2 | 9/2018 | Stapleton et al. |
| 10,141,896 B2 | 11/2018 | Huang |
| 10,141,961 B1 | 11/2018 | Huang et al. |
| 10,181,914 B2 | 1/2019 | Li et al. |
| 10,404,296 B2 | 9/2019 | Kim et al. |
| 10,447,511 B2 | 10/2019 | Xie et al. |
| 10,469,109 B2 | 11/2019 | Gutman et al. |
| 10,523,159 B2 | 12/2019 | Megretski et al. |
| 10,581,470 B2 | 3/2020 | Megretski et al. |
| 10,644,657 B1 | 5/2020 | Megretski et al. |
| 2001/0050592 A1 | 12/2001 | Wright et al. |
| 2002/0080891 A1 | 6/2002 | Ahn et al. |
| 2003/0058960 A1 | 3/2003 | Lee |
| 2003/0184374 A1 | 10/2003 | Huang et al. |
| 2003/0207680 A1 | 11/2003 | Yang et al. |
| 2004/0076247 A1 | 4/2004 | Barak et al. |
| 2004/0116083 A1 | 6/2004 | Suzuki et al. |
| 2004/0121741 A1 | 6/2004 | Rashev et al. |
| 2004/0142667 A1 | 7/2004 | Lochhead et al. |
| 2004/0196922 A1 | 10/2004 | Leffel |
| 2005/0001684 A1 | 1/2005 | Braithwaite |
| 2005/0163251 A1 | 7/2005 | McCallister |
| 2005/0163252 A1 | 7/2005 | McCallister et al. |
| 2005/0180527 A1 | 8/2005 | Suzuki et al. |
| 2005/0190857 A1 | 9/2005 | Braithwaite |
| 2006/0022751 A1 | 2/2006 | Fuller et al. |
| 2006/0154622 A1 | 7/2006 | Piirainen |
| 2006/0229036 A1 | 10/2006 | Muller et al. |
| 2006/0276147 A1 | 12/2006 | Suzuki |
| 2007/0091992 A1 | 4/2007 | Dowling |
| 2007/0230557 A1 | 10/2007 | Balasubramonian et al. |
| 2007/0241812 A1 | 10/2007 | Yang et al. |
| 2008/0003945 A1 | 1/2008 | Wenham |
| 2008/0019453 A1 | 1/2008 | Zhao et al. |
| 2008/0039045 A1 | 2/2008 | Filipovic et al. |
| 2008/0057882 A1 | 3/2008 | Singerl |
| 2008/0101502 A1 | 5/2008 | Navidpour et al. |
| 2008/0247487 A1 | 10/2008 | Cai et al. |
| 2008/0260066 A1 | 10/2008 | Cai et al. |
| 2008/0268794 A1* | 10/2008 | Mege ................... H03F 1/3247 455/114.3 |
| 2008/0268795 A1 | 10/2008 | Saed |
| 2008/0285640 A1 | 11/2008 | McCallister |
| 2009/0201084 A1 | 8/2009 | See et al. |
| 2010/0026354 A1 | 2/2010 | Utsunomiya et al. |
| 2010/0048149 A1 | 2/2010 | Tang et al. |
| 2010/0225390 A1 | 9/2010 | Brown et al. |
| 2010/0297966 A1 | 11/2010 | Row et al. |
| 2011/0044158 A1 | 2/2011 | Tao et al. |
| 2011/0085490 A1 | 4/2011 | Schlee |
| 2011/0098011 A1 | 4/2011 | Camp, Jr. et al. |
| 2011/0128992 A1 | 6/2011 | Maeda et al. |
| 2011/0135035 A1 | 6/2011 | Bose et al. |
| 2011/0150130 A1 | 6/2011 | Kenington |
| 2011/0163806 A1 | 7/2011 | Hongo |
| 2011/0187437 A1 | 8/2011 | Perreault et al. |
| 2011/0235734 A1 | 9/2011 | Kenington |
| 2011/0255627 A1 | 10/2011 | Gotman et al. |
| 2011/0273234 A1 | 11/2011 | Van der Heijen et al. |
| 2011/0273236 A1 | 11/2011 | Heijden et al. |
| 2012/0093210 A1 | 4/2012 | Schmidt et al. |
| 2012/0108189 A1 | 5/2012 | McCallister et al. |
| 2012/0119810 A1 | 5/2012 | Bai |
| 2012/0119811 A1 | 5/2012 | Bai et al. |
| 2012/0119831 A1 | 5/2012 | Bai |
| 2012/0154033 A1 | 6/2012 | Lozhkin |
| 2012/0154430 A1 | 6/2012 | Matsushima et al. |
| 2012/0176195 A1 | 7/2012 | Dawson et al. |
| 2012/0194271 A1* | 8/2012 | Yamamoto ........... H04B 1/0475 330/149 |
| 2012/0200355 A1 | 8/2012 | Braithwaite |
| 2012/0219048 A1 | 8/2012 | Camuffo et al. |
| 2012/0286865 A1 | 11/2012 | Chandrasekaran |
| 2012/0286985 A1 | 11/2012 | Chandrasekaran et al. |
| 2012/0293252 A1 | 11/2012 | Sorrells et al. |
| 2012/0295558 A1 | 11/2012 | Wang et al. |
| 2013/0033317 A1 | 2/2013 | Hawkes |
| 2013/0034188 A1 | 2/2013 | Rashev et al. |
| 2013/0044791 A1 | 2/2013 | Rimini et al. |
| 2013/0064325 A1 | 3/2013 | Kilambi et al. |
| 2013/0094610 A1 | 4/2013 | Ghannouchi et al. |
| 2013/0094612 A1 | 4/2013 | Kim et al. |
| 2013/0163512 A1 | 6/2013 | Rexberg et al. |
| 2013/0243121 A1 | 9/2013 | Bai |
| 2013/0251065 A1 | 9/2013 | Bai |
| 2013/0259159 A1 | 10/2013 | McCallister et al. |
| 2013/0329833 A1 | 12/2013 | Bai |
| 2014/0009225 A1 | 1/2014 | Laporte |
| 2014/0038659 A1 | 2/2014 | Wei et al. |
| 2014/0161159 A1 | 6/2014 | Black et al. |
| 2014/0161207 A1 | 6/2014 | Teterwak |
| 2014/0177695 A1 | 6/2014 | Cha et al. |
| 2014/0187182 A1 | 7/2014 | Yan et al. |
| 2014/0254716 A1 | 9/2014 | Zhou et al. |
| 2014/0274105 A1 | 9/2014 | Wang |
| 2014/0292579 A1 | 10/2014 | Oh et al. |
| 2014/0347126 A1 | 11/2014 | Laporte et al. |
| 2015/0043313 A1 | 2/2015 | Stranczl et al. |
| 2015/0043323 A1 | 2/2015 | Choi et al. |
| 2015/0043678 A1 | 2/2015 | Hammi |
| 2015/0049841 A1 | 2/2015 | Laporte et al. |
| 2015/0061761 A1 | 3/2015 | Wills et al. |
| 2015/0103952 A1 | 4/2015 | Wang et al. |
| 2015/0123735 A1 | 5/2015 | Wimpenny |
| 2015/0124907 A1 | 5/2015 | Li et al. |
| 2015/0171768 A1 | 6/2015 | Perreault |

(56) References Cited

U.S. PATENT DOCUMENTS

| | | |
|---|---|---|
| 2015/0325913 A1 | 11/2015 | Vagman |
| 2015/0326349 A1 | 11/2015 | Yang et al. |
| 2015/0333781 A1 | 11/2015 | Alon et al. |
| 2015/0357975 A1 | 12/2015 | Avniel et al. |
| 2015/0358039 A1 | 12/2015 | Xiong et al. |
| 2015/0381216 A1 | 12/2015 | Shor et al. |
| 2015/0381220 A1 | 12/2015 | Gal et al. |
| 2016/0013820 A1 | 1/2016 | Yamanouchi |
| 2016/0028433 A1 | 1/2016 | Ding et al. |
| 2016/0065147 A1 | 3/2016 | Pratt et al. |
| 2016/0087604 A1 | 3/2016 | Kim et al. |
| 2016/0094253 A1 | 3/2016 | Weber et al. |
| 2016/0095110 A1 | 3/2016 | Li et al. |
| 2016/0100180 A1 | 4/2016 | Oh |
| 2016/0112222 A1 | 4/2016 | Pashay-Kojouri et al. |
| 2016/0174118 A1 | 6/2016 | Duan et al. |
| 2016/0191020 A1 | 6/2016 | Velazquez |
| 2016/0211577 A1 | 7/2016 | Miller et al. |
| 2016/0241277 A1 | 8/2016 | Rexberg et al. |
| 2016/0249300 A1 | 8/2016 | Tsai et al. |
| 2016/0285485 A1 | 9/2016 | Fehri et al. |
| 2016/0308577 A1 | 10/2016 | Molina et al. |
| 2016/0336906 A1 | 11/2016 | Lee et al. |
| 2016/0373072 A1 | 12/2016 | Magesacher et al. |
| 2017/0005627 A1 | 1/2017 | Zhao et al. |
| 2017/0033969 A1 | 2/2017 | Yang et al. |
| 2017/0041124 A1 | 2/2017 | Khandani |
| 2017/0047899 A1 | 2/2017 | Abdelrahman et al. |
| 2017/0077981 A1 | 3/2017 | Tobisu et al. |
| 2017/0176507 A1 | 6/2017 | O'Keeffe et al. |
| 2017/0214438 A1 | 7/2017 | Ghannouchi et al. |
| 2017/0237455 A1 | 8/2017 | Ye et al. |
| 2017/0244582 A1 | 8/2017 | Gal et al. |
| 2017/0302233 A1 | 10/2017 | Huang |
| 2017/0338841 A1 | 11/2017 | Pratt |
| 2018/0097530 A1 | 4/2018 | Yang et al. |
| 2018/0159568 A1 | 6/2018 | Matsuura et al. |
| 2018/0167092 A1 | 6/2018 | Hausmair et al. |
| 2018/0287569 A1 | 10/2018 | Xu et al. |
| 2018/0337700 A1 | 11/2018 | Huang et al. |
| 2019/0007075 A1 | 1/2019 | Kim et al. |
| 2019/0104000 A1 | 4/2019 | Xie et al. |
| 2019/0238204 A1 | 8/2019 | Kim et al. |
| 2019/0260401 A1 | 8/2019 | Megretski et al. |
| 2019/0260402 A1 | 8/2019 | Chuang et al. |
| 2019/0348956 A1 | 11/2019 | Megretski et al. |
| 2019/0363676 A1 | 11/2019 | Megretski et al. |
| 2019/0363742 A1 | 11/2019 | Megretski et al. |
| 2020/0028476 A1 | 1/2020 | Kim et al. |
| 2020/0067543 A1 | 2/2020 | Kim et al. |

FOREIGN PATENT DOCUMENTS

| | | |
|---|---|---|
| CN | 104796170 A | 7/2015 |
| CN | 104871433 A | 8/2015 |
| CN | 105634539 A | 6/2016 |
| CN | 106464280 A | 2/2017 |
| EP | 0916967 A2 | 5/1999 |
| EP | 1560329 A1 | 8/2005 |
| EP | 1732208 A1 | 12/2006 |
| EP | 2991221 A1 | 3/2016 |
| JP | 2005-065211 A | 3/2005 |
| JP | 2010-136123 A | 6/2010 |
| JP | 2013-542696 A | 11/2013 |
| JP | 2014-533017 A | 12/2014 |
| WO | 20120154430 A1 | 11/2012 |
| WO | 2015107392 A1 | 7/2015 |
| WO | 2018156932 A1 | 8/2018 |
| WO | 2018227093 A1 | 12/2018 |
| WO | 2018227111 A1 | 12/2018 |
| WO | 2019/014422 A1 | 1/2019 |
| WO | 2019031714 A1 | 2/2019 |
| WO | 2019070573 A1 | 4/2019 |
| WO | 2019094713 A1 | 5/2019 |
| WO | 2019094720 A1 | 5/2019 |

OTHER PUBLICATIONS

Aguirre, et al., "On the Interpretation and Practice of Dynamical Differences Between Hammerstein and Wiener Models", IEEE Proceedings on Control TheoryAppl; vol. 152, No. 4, Jul. 2005, pp. 349-356.

Barradas, et al. "Polynomials and LUTs in PA Behavioral Modeling: A Fair Theoretical Comparison", IEEE Transactions on Microwave Theory and Techniques; vol. 62, No. 12, Dec. 2014, pp. 3274-3285.

Bosch et al. "Measurement and Simulation of Memory Effects in Predistortion Linearizers," IEEE Transactions on Mircrowave Theory and Techniques; vol. 37.No. 12; Dec. 1989, pp. 1885-1890.

Braithwaite, et al. "Closed-Loop Digital Predistortion (DPD) Using an Observation Path with Limited Bandwidth" IEEE Transactions on Microwave Theory and Techniques; vol. 63, No. 2; Feb. 2015, pp. 726-736.

Cavers, "Amplifier Linearization Using a Digital Predistorter with Fast Adaption and Low Memory Requirements;" IEEE Transactions on Vehicular Technology; vol. 39; No. 4; Nov. 1990, pp. 374-382.

D'Andrea et al., "Nonlinear Predistortion of OFDM Signals over Frequency-Selective Fading Channels," IEEE Transactions on Communications; vol. 49; No. 5, May 2001; pp. 837-843.

Guan, et al. "Optimized Low-Complexity Implementation of Least Squares Based Model Extraction of Digital Predistortion of RF Power Amplifiers", IEEE Transactions on Microwave Theory and Techniques; vol. 60, No. 3, Mar. 2012; pp. 594-603.

Henrie, et al., "Cancellation of Passive Intermodulation Distortion in Microwave Networks", Proceedings of the 38.sup.th European Microwave Conference, Oct. 2008, Amsterdam, The Netherlands, pp. 1153-1156.

Hong et al., "Weighted Polynomial Digital Predistortion for Low Memory Effect Doherty Power Amplifier," IEEE Transactions on Microwave Theory and Techniques; vol. 55; No. 5, May 2007, pp. 925-931.

Kwan, et al., "Concurrent Multi-Band Envelope Modulated Power Amplifier Linearized Using Extended Phase-Aligned DPD", IEEE Transactions on Microwave Theory and Techniques; vol. 62, No. 12, Dec. 2014, pp. 3298-3308.

Lajoinie et al. Efficient Simulation of NPR for the Optimum Design of Satellite Transponders SSPAs, EEE MIT-S International; vol. 2; Jun. 1998; pp. 741-744.

Li et al. "High-Throughput Signal Component Separator for Asymmetric Multi-Level Outphasing Power Amplifiers," IEEE Journal of Solid-State Circuits; vol. 48; No. 2; Feb. 2013; pp. 369-380.

Liang, et al. "A Quadratic-Interpolated Lut-Based Digital Predistortion Techniques for Cellular Power Amplifiers", IEEE Transactions on Circuits and Systems; II: Express Briefs, vol. 61, No. 3, Mar. 2014; pp. 133-137.

Liu, et al. "Digital Predistortion for Concurrent Dual-Band Transmitters Using 2-D Modified Memory Polynomials", IEEE Transactions on Microwave Theory and Techniques, vol. 61, No. 1, Jan. 2013, pp. 281-290.

Molina, et al. "Digital Predistortion Using Lookup Tables with Linear Interpolation and Extrapolation: Direct Least Squares Coefficient Adaptation", IEEE Transactions on Microwave Theory and Techniques, vol. 65, No. 3, Mar. 2017; pp. 980-987.

Morgan, et al. "A Generalized Memory Polynomial Model for Digital Predistortion of RF Power Amplifiers," IEEE Transactions of Signal Processing; vol. 54; No. 10; Oct. 2006; pp. 3852-3860.

Muta et al., "Adaptive predistortion linearization based on orthogonal polynomial expansion for nonlinear power amplifiers in OFDM systems", Communications and Signal Processing (ICCP), International Conference on, IEEE, pp. 512-516, 2011.

Naraharisetti, et a., "2D Cubic Spline Implementation for Concurrent Dual-Band System", IEEE, 2013, pp. 1-4.

Naraharisetti, et al. "Efficient Least-Squares 2-D-Cubic Spline for Concurrent Dual-Band Systems", IEEE Transactions on Microwave Theory and Techniques, vol. 63; No. 7, Jul. 2015; pp. 2199-2210.

Panigada, et al. "A 130 mW 100 MS/s Pipelined ADC with 69 SNDR Enabled by Digital Harmonic Distortion Correction," IEEE Journal of Solid-State Circuits; vol. 44; No. 12; Dec. 2009, pp. 3314-3328.

(56) References Cited

OTHER PUBLICATIONS

Peng, et al. "Digital Predistortion for Power Amplifier Based on Sparse Bayesian Learning", IEEE Transactions on Circuits and Systems, II: Express Briefs; 2015, pp. 1-5.

Quindroit et al. "FPGA Implementation of Orthogonal 2D Digital Predistortion System for Concurrent Dual-Band Power Amplifiers Based on Time-Division Multiplexing", IEEE Transactions on Microwave Theory and Techniques; vol. 61; No. 12, Dec. 2013, pp. 4591-4599.

Rawat, et al. "Adaptive Digital Predistortion of Wireless Power Amplifiers/Transmitters Using Dynamic Real-Valued Focused Time-Delay Line Neural Networks", IEEE Transactions on Microwave Theory and Techniques; vol. 58, No. 1; Jan. 2010; pp. 95-104.

Safari, et al."Spline-Based Model for Digital Predistortion of Wide-Band Signals for High Power Amplifier Linearization", IEEE; 2007, pp. 1441-1444.

Sevic, et al. "A Novel Envelope-Termination Load-Pull Method of ACPR Optimization of RF/Microwave Power Amplifiers," IEEE MTT-S International; vol. 2, Jun. 1998; pp. 723-726.

Tai, "Efficient Watt-Level Power Amplifiers in Deeply Scaled CMOS," Ph.D. Dissertation; Carnegie Mellon University; May 2011; 129 pages.

Tehran, et al. "Modeling of Long Term Memory Effects in RF Power Amplifiers with Dynamic Parameters", IEEE; 2012, pp. 1-3.

Yu et al. "A Generalized Model Based on Canonical Piecewise Linear Functions for Digital Predistortion", Proceedings of the Asia-Pacific Microwave Conference; 2016, pp. 1-4.

Yu, et al. "Band-Limited Volterra Series-Based Digital Predistortion for Wideband RF Power Amplifiers," IEEE Transactions of Microwave Theory and Techniques; vol. 60; No. 12; Dec. 2012, pp. 4198-4208.

Yu, et al."Digital Predistortion Using Adaptive Basis Functions", IEEE Transations on Circuits and Systems—I. Regular Papers; vol. 60, No. 12; Dec. 2013, pp. 3317-3327.

Zhang et al. "Linearity Performance of Outphasing Power Amplifier Systems," Design of Linear Outphasing Power Amplifiers; Google e-book; 2003; Retrieved on Jun. 13, 2014; Retrieved from Internet <URL:http:www.artechhouse.com/uploads/public/documents/chapters/Zhang-LarsonCH- 2.pdf; pp. 35-85.

Zhu et al. "Digital Predistortion for Envelope-Tracking Power Amplifiers Using Decomposed Piecewise Volterra Sereis," IEEE Transactions on Microwave Theory and Techniques; vol. 56; No. 10; Oct. 2008; pp. 2237-2247.

Cidronali, A., I. Magrini, R. Fagotti, and G. Manes. "A new approach for concurrent dual-band IF digital predistortion: System design and analysis." In 2008 Workshop on Integrated Nonlinear Microwave and Millimetre-Wave Circuits, pp. 127-130. IEEE, 2008.

Henrie, Justin, Andrew Christianson, and William J. Chappell. "Cancellation of passive intermodulation distortion in microwave networks." In Microwave Conference, 2008. EuMC 2008. 38th European, pp. 1153-1156. IEEE, 2008.

Riihonen et al., "Mitigation of Loopback Self-Interference in Full-Duplex Mimo Relays" IEEE Transactions on Signal Processing, 59(12), 5983-5993, Dec. 2011.

\* cited by examiner

```
┌─────────────────────────────────────────────────────────────┐
│ Selecting at least one location of a selection buffer, with the selection │ 210
│ buffer storing a plurality of observed output samples obtained from │
│ one or more of output batches produced by a signal chain, according │
│ to a pseudo-random buffer selection process, and accessing at least │
│ one observed output sample. The at least one observed output │
│ sample is generated in response to corresponding one or more input │
│ samples provided to a digital compensator applying to one or more │
│ input batches a plurality of basis functions, weighed by compensator │
│ coefficients, to produce intermediary samples, with the one or more │
│ intermediary samples provided to the signal chain. │
└─────────────────────────────────────────────────────────────┘
                               │
                               ▼
┌─────────────────────────────────────────────────────────────┐
│ Computing an approximation of a sub-gradient value computed │ 220
│ according to a stochastic gradient process to derive a sub-gradient of │
│ an error function representing a relationship between the accessed at │
│ least one observed output sample stored in the pseudo randomly │
│ selected at least one location of the selection buffer, and at least one │
│ of, for example, the corresponding one or more or more input │
│ samples, or one or more intermediate samples, produced by the │
│ digital compensator, corresponding to the pseudo randomly selected │
│ at least one location of the selection buffer storing the at least one │
│ observed output sample. │
└─────────────────────────────────────────────────────────────┘
                               │
                               ▼
┌─────────────────────────────────────────────────────────────┐
│ Computing updated values for the compensator coefficients based on │ 230
│ current values of the compensator coefficients and the computed │
│ approximation of the sub-gradient value computed according to the │
│ sub-gradient of the error function. │
└─────────────────────────────────────────────────────────────┘
                               │
                               ▼
┌─────────────────────────────────────────────────────────────┐
│ Replacing, at a time instance determined independently of the │ 240
│ pseudo-random buffer selection process, content of at least a portion │
│ of the selection buffer with different one or more observed output │
│ samples responsive to one or more other input samples. │
└─────────────────────────────────────────────────────────────┘
```

310 Storing, at a selection buffer, a plurality of observed output samples of an output signal produced by a signal chain in response to a received input signal, the output signal comprising a plurality of output batches of the output signal, each batch of the output signal corresponding to a different one or more batches of the input signal. The output signal produced by the signal chain includes non-linear distortions.

320 Deriving, using a stochastic gradient process, a plurality of sets of coefficients, used by a digital compensator for respectively weighing a plurality of basis functions applied by the digital compensator to input samples of the input signal, including:

322 Selecting, according to a pseudo-random buffer selection process, at least one location of the selection buffer to access at least one of the plurality of observed output samples stored in the selection buffer.

324 Computing updated values for the plurality of sets of coefficients based on current intermediate values for the plurality of sets of coefficients and a sub-gradient value computed according to a sub-gradient of an error function representing a relationship between the at least one of the plurality of observed output samples at the pseudo-randomly selected location of the selection buffer, and at least one or more input data samples and/or intermediate samples produced by the digital compensator, corresponding to the at least one of the plurality of observed output sample stored at the pseudo randomly selected location of the selection buffer.

326 Repeating the selecting to select a subsequent at least one location of the selection buffer, according to the buffer selection pseudo-random process, to access a subsequent at least one observed output sample, and computing updated values for the plurality of the sets of coefficients based, at least in part, on the subsequent at least one observed output sample.

328 Replacing, at a time instance determined independently of the pseudo-random buffer selection process, at least a portion of the plurality of observed output samples stored in the selection buffer with a different set of observed output samples, corresponding to a different set of input samples provided to the digital compensator.

*FIG. 3*

BUFFER MANAGEMENT FOR ADAPTIVE DIGITAL PREDISTORTION

BACKGROUND

The present disclosure relates to approaches for regular/continuous adaptation of parameterized digital predistorter (compensator).

Power amplifiers, especially those used to transmit radio frequency communications, generally have nonlinear characteristics. For example, as a power amplifier's output power approaches its maximum rated output, nonlinear distortion of the output occurs. One way of compensating for the nonlinear characteristics of power amplifiers is to 'predistort' an input signal (e.g., by adding an 'inverse distortion' to the input signal) to negate the nonlinearity of the power amplifier before providing the input signal to the power amplifier. The resulting output of the power amplifier is a linear amplification of the input signal with reduced nonlinear distortion. Digital predistorted devices (comprising, for example, power amplifiers) are relatively inexpensive and power efficient. These properties make digital predistorted power amplifiers attractive for use in telecommunication systems where amplifiers are required to inexpensively, efficiently, and accurately reproduce the signal present at their input. However, the computation effort associated with conventional digital predistortion (DPD) adaptation processes is substantial, which adversely effects the predistortion accuracy and robustness due to the limits the computational efforts may place on the number and speed at which DPD coefficients can be derived.

SUMMARY

Adaptive optimization of digital predistortion (DPD) parameters (e.g., coefficients applied to a set of predetermined basis functions) can result in a significant computational undertaking that can tax the resources of a computing system, slow down processes, and affect the quality of optimization. In some embodiments described herein, processes to approximate DPD parameters in an efficient way that relies on efficient management of a buffer holding samples used in DPD parameter determination processes are disclosed. The buffer management operations do not require that input/output samples (needed for the DPD parameter determination processes) be stored based on some known schedule. Rather, the buffer (or a portion thereof) may be populated with input and output samples according to a process that is independent of the processes used to perform the actual computation of DPD parameters/coefficients (e.g., replacing content of the buffer(s) may be performed at time instances determined independently of a process to select the samples that are used to compute the DPD parameters/coefficients). As such, the buffer may be updated according to any type of scheduling process (e.g., when new samples become available, according to a pseudo-random schedule, etc.)

The DPD parameter determination processes of some of the embodiments described herein also rely on a stochastic gradient approach in which samples in the buffer (populated according to whichever scheduling approach is used) are selected according a pseudo-random process that selects buffer locations (storing corresponding input and output samples) independently of when the buffer's content gets replaced (in accordance with the buffer replacement scheduling process implemented). The realized buffer management and control approaches (a buffer content replacement process that is independent of the buffer location selection process) used in conjunction with the stochastic gradient approaches of some of the described embodiments result in a computationally efficient approach for computing DPD coefficient approximations.

In a general aspect, an adaptation module of a linearization system performs regular updates of DPD coefficients based on a stochastic subgradient approach that uses approximation of gradient error function values, with such approximations computed based on pseudo-randomly selection of observed output samples of the linearization system (and their corresponding input samples) stored in a buffer, and based on an independent replacement process to replace at least some of samples stored in the buffer.

In some variations, a method for digital compensation is provided that includes selecting at least one location of a selection buffer, the selection buffer storing a plurality of observed output samples obtained from one or more of output batches produced by a signal chain, according to a pseudo-random buffer selection process, and accessing at least one observed output sample, with the at least one observed output sample being generated in response to corresponding one or more input samples provided to a digital compensator applying to one or more input batches a plurality of basis functions, weighed by compensator coefficients, to produce intermediary samples, and with the one or more intermediary samples provided to the signal chain. The method further includes computing an approximation of a sub-gradient value computed according to a stochastic gradient process to derive a sub-gradient of an error function representing a relationship between the accessed at least one observed output sample stored in the pseudo randomly selected at least one location of the selection buffer, and at least one of, for example, the corresponding one or more or more input samples, and/or one or more intermediate samples, produced by the digital compensator, corresponding to the pseudo randomly selected at least one location of the selection buffer storing the at least one observed output sample. The method additionally includes computing updated values for the compensator coefficients based on current values of the compensator coefficients and the computed approximation of the sub-gradient value computed according to the sub-gradient of the error function, and replacing, at a time instance determined independently of the pseudo-random buffer selection process, content of at least a portion of the selection buffer with different one or more observed output samples responsive to one or more other input samples.

Embodiments of the method include at least some of the features described in the present disclosure, as well as one or more of the following features.

Computing the updated values for the compensator coefficients may include computing the updated values for the compensator coefficients based on a sum of the current values of the compensator coefficients and a product of a pre-determined multiple, representative of a step size, and the approximation of the sub-gradient value computed according to the sub-gradient of the error function.

Computing the updated values for the compensator coefficients may include deriving the updated values for the compensator coefficients according to the relationship $$\tilde{x}_{k+1} = \tilde{x}_k + \alpha a[\tau_k]'(e[\tau_k] - a[\tau_k]\tilde{x}_k) - \alpha\rho\tilde{x}_k, \text{ with } \tilde{x} = 0,$$

where $z_k$ are the current values of the compensator coefficients, $\tilde{x}_{k+1}$ are the updated compensator coefficients, $\tau_1, \tau_2, \ldots, \tau_n$ are independent random variables uniformly distributed on $T=\{t\}$, $a[\tau]$ represents a matrix of values resulting from application of the basis functions at time τ to the one or more input samples corresponding to the pseudo randomly selected observed output sample, e[τ] is input/output mismatch in the observed data between an output of an observer receiver and the output of the digital compensator, $\rho>0$ is a regularization constant, and $\alpha>0$ is a value representative of the step size, such that $\alpha(\rho+|a[t]|^2)<A$ for every $t \in T$, where A is some pre-specified constant value.

The method may further include adjusting the value of a representative of the step size based on a measure of progress of the stochastic gradient process, with the measure of progress being determined by comparing an average values of $|e[\tau_k]|$ and $|e[\tau_k]-a[\tau_k]\tilde{x}_k|$.

The method may further include repeating the pseudo-random buffer selection process to select a subsequent at least one buffer location to access a different at least one observed output sample from the selection buffer, and computing updated values for the compensator coefficients based, at least in part, on the different at least one observed output sample.

Replacing, at the time instance determined independently of the pseudo-random buffer selection process, the content of the at least the portion of the selection buffer may include replacing the content of the at least the portion of the selection buffer based on one or more of, for example, i) receipt of a replacement signal indicating availability of the different one or more replacement observed output samples responsive to the one or more other input samples, ii) scheduled arrival of the different one or more replacement observed output samples responsive to the one or more other input samples, and/or iii) unscheduled arrival at an arbitrary time instance of the different one or more replacement observed output samples responsive to the one or more other input samples.

Replacing the at least the portion of the selection buffer may include flushing the at least the portion of the selection buffer storing the plurality of observed output samples, and filling the at least the portion of the flushed selection buffer with the different one or more replacement observed output samples responsive to the one or more other input samples.

Replacing the at least the portion of the selection buffer may include replacing according to the pseudo-random replacement process the entire selection buffer storing the plurality of observed output samples, with a different set of observed output samples, corresponding to a different set of input samples provided to the digital compensator.

The method may further include one or more of, for example, communicating the output signal of the signal chain to a remote device via one or more of, for example, a wired communications interface and/or a wireless communication interface, and/or receiving the input signal via one or more of, for example, the wired communications interface and/or the wireless communication interface.

In some variations, a linearization system is provided that includes a signal chain comprising at least one analog electronic amplification element, with the signal chain producing output signals including non-linear distortions, a digital compensator to compensate for non-linear behavior of the signal chain by applying a plurality of basis functions weighed by compensator coefficients to input signals to the compensator resulting in intermediary samples provided as input to the signal chain, an observation receiver to produce observed output samples of the output signals produced by the signal chain, a selection buffer to store a plurality of the observed output samples, and an adaptation module. The adaptation module is configured to select at least one location of the selection buffer, according to a pseudo-random buffer selection process, and access at least one observed output sample. The adaptation module is further configured to compute an approximation of a sub-gradient value computed according to a stochastic gradient process to derive a sub-gradient of an error function representing a relationship between the accessed at least one observed output sample stored in the pseudo randomly selected at least one location of the selection buffer, and at least one of, for example, corresponding one or more or more input samples, and/or corresponding one or more intermediate samples produced by the digital compensator in response to the one or more input samples. The adaptation module is additionally configured to compute updated values for the compensator coefficients based on current values of the compensator coefficients and the computed approximation of the sub-gradient value computed according to the sub-gradient of the error function, and replace, at a time instance determined independently of the pseudo-random buffer selection process, content of at least a portion of the selection buffer with different one or more observed output samples responsive to one or more other input samples.

In some variations, a non-transitory machine-readable medium is provided that stores a design structure comprising elements that, when processed in a computer-aided design system, generate a machine-executable representation of a linearization system that is used to fabricate hardware comprising a selecting circuit to select at least one location of a selection buffer, the selection buffer storing a plurality of observed output samples obtained from one or more of output batches produced by a signal chain, according to a pseudo-random buffer selection process, and access at least one observed output sample, with the at least one observed output sample being generated in response to corresponding one or more input samples provided to a digital compensator applying to one or more input batches a plurality of basis functions, weighed by compensator coefficients, to produce intermediary samples, and with the one or more intermediary samples provided to the signal chain. The linearization system further includes a computing circuit to compute an approximation of a sub-gradient value computed according to a stochastic gradient process to derive a sub-gradient of an error function representing a relationship between the accessed at least one observed output sample stored in the pseudo randomly selected at least one location of the selection buffer, and at least one of, for example, the corresponding one or more or more input samples, and/or one or more intermediate samples, produced by the digital compensator, corresponding to the pseudo randomly selected at least one location of the selection buffer storing the at least one observed output sample. The linearization system additionally includes a second computing circuit to compute updated values for the compensator coefficients based on current values of the compensator coefficients and the computed approximation of the sub-gradient value computed according to the sub-gradient of the error function, and a replacing circuit to replace, at a time instance determined independently of the pseudo-random buffer selection process, content of at least a portion of the selection buffer with different one or more observed output samples responsive to one or more other input samples.

In some variations, a non-transitory computer readable media is provided, that is programmed with instructions, executable on a processor, to select at least one location of a selection buffer, the selection buffer storing a plurality of observed output samples obtained from one or more of output batches produced by a signal chain, according to a pseudo-random buffer selection process, and access at least one observed output sample, with the at least one observed output sample being generated in response to corresponding one or more input samples provided to a digital compensator applying to one or more input batches a plurality of basis functions, weighed by compensator coefficients, to produce intermediary samples, and with the one or more intermediary samples provided to the signal chain. The instructions include one or more instructions to compute an approximation of a sub-gradient value computed according to a stochastic gradient process to derive a sub-gradient of an error function representing a relationship between the accessed at least one observed output sample stored in the pseudo randomly selected at least one location of the selection buffer, and at least one of, for example, the corresponding one or more or more input samples, and/or one or more intermediate samples, produced by the digital compensator, corresponding to the pseudo randomly selected at least one location of the selection buffer storing the at least one observed output sample, The instructions include additional one or more instructions to compute updated values for the compensator coefficients based on current values of the compensator coefficients and the computed approximation of the sub-gradient value computed according to the sub-gradient of the error function, and replace, at a time instance determined independently of the pseudo-random buffer selection process, content of at least a portion of the selection buffer with different one or more observed output samples responsive to one or more other input samples.

Embodiments of the linearization system, the design structure, and/or the computer readable media may include at least some of the features described in the present disclosure, including any of the above method features.

In some variations, another method for digital compensation of a signal chain comprising at least one analog electronic amplification element, is provided that includes storing, at a selection buffer, a plurality of observed output samples of an output signal produced by the signal chain in response to a received input signal, the output signal comprising a plurality of output batches of the output signal, each batch of the output signal corresponding to a different one or more batches of the input signal, with the output signal produced by the signal chain including non-linear distortions. The method also includes deriving, using a stochastic gradient process, a plurality of sets of coefficients, used by a digital compensator for respectively weighing a plurality of basis functions applied by the digital compensator to input samples of the input signal, with deriving the plurality of sets of coefficients using the stochastic gradient process including selecting, according to a pseudo-random buffer selection process, at least one location of the selection buffer to access at least one of the plurality of observed output samples stored in the selection buffer, and computing updated values for the plurality of sets of coefficients based on current intermediate values for the plurality of sets of coefficients and a sub-gradient value computed according to a sub-gradient of an error function representing a relationship between the at least one of the plurality of observed output samples at the pseudo-randomly selected location of the selection buffer, and at least one or more input data samples, or intermediary samples produced by the digital compensator, corresponding to the at least one of the plurality of observed output samples stored at the pseudo randomly selected location of the selection buffer. The deriving additionally includes repeating the selecting to select a subsequent at least one location of the selection buffer, according to the buffer selection pseudo-random process, to access a subsequent at least one observed output sample, and computing updated values for the plurality of the sets of coefficients based, at least in part, on the subsequent at least one observed output sample, and replacing, at a time instance determined independently of the pseudo-random buffer selection process, at least a portion of the plurality of observed output samples stored in the selection buffer with a different set of observed output samples, corresponding to a different set of input samples provided to the digital compensator.

Embodiments of the additional method may include at least some of the features described in the present disclosure, including any of the above method, linearization system, structure design, and computer readable medium features, as well as one or more of the following features.

Replacing, at the time instance determined independently of the pseudo-random buffer selection process, the at least the portion of observed output samples may include replacing the at least the portion of observed output samples based on one or more of, for example, i) receipt of a replacement signal indicating availability of the different set of observed output samples corresponding to the different set of input samples, ii) scheduled arrival of the different set of observed output samples corresponding to the different set of input samples, and/or iii) unscheduled at an arbitrary time instance arrival of the different set of observed output samples corresponding to the different set of input samples.

Computing the updated values for the plurality of sets of coefficients based on the current intermediate values for the plurality of the sets of coefficients and the sub-gradient value computed according to the sub-gradient of the error function may include computing the updated values for the plurality of sets of coefficients based on the current intermediate values for the plurality of sets of coefficients and a pre-determined multiple, representative of a step size, of the sub-gradient value computed according to the sub-gradient of the error function using the accessed at least one of the plurality observed output sample and the at least one or more input data samples corresponding to the at least one observed output sample.

Computing the updated values for the plurality of sets of coefficients may include deriving the updated values for the plurality of sets of coefficients according to the relationship $$\tilde{x}_{k+1} = \tilde{x}_k + \alpha a[\tau_k]'(e[\tau_k] - a[\tau_k]\tilde{x}_k) - \alpha\rho\tilde{x}_k, \text{ with } \tilde{x}_0 = 0,$$

where $\tau_1, \tau_2, \ldots, \tau_n$ are independent random variables uniformly distributed on $T=\{t\}$, $a[\tau]$ represents a matrix of values resulting from application of the basis functions at time $\tau$ to the input samples corresponding to the pseudo randomly selected observed output sample, $e[\tau]$ is input/output mismatch in the observed data between an output of an observer receiver and the output of the digital compensator, $\rho > 0$ is a regularization constant, and $\alpha > 0$ is a value representative of the step size, such that $\alpha(\rho + |a[t]|^2) < A$ for every $t \in T$, where A is some pre-specified constant value.

The method may further include adjusting the value of $\alpha$ representative of the step size based on a measure of progress of the stochastic gradient process, wherein the measure of progress is determined by comparing an average values of $|e[\tau_k]|$ and $|e[\tau_k] - a[\tau_k]\tilde{x}_k|$.

The method may further include receiving the input signal via one or more of, for example, a wired communications interface and/or a wireless communication interface.

The method may further include communicating the output signal of the signal chain to a remote device via one or more of, for example, a wired communications interface, and/or a wireless communication interface.

In some variations, an additional linearization system is provided that includes a signal chain comprising at least one analog electronic amplification element, the signal chain producing output signals including non-linear distortions, a digital compensator to compensate for non-linear behavior of the signal chain by applying a plurality of basis functions weighed by compensator coefficients to input signals to the compensator resulting in intermediary samples provided as input to the signal chain, an observation receiver to produce a plurality of observed output samples of an output signal produced by the signal chain in response to a received input signal, the output signal comprising a plurality of output batches of the output signal, each batch of the output signal corresponding to a different one or more batches of the input signal, with the output signal produced by the signal chain includes non-linear distortions, a selection buffer to store the plurality of the observed output samples, and an adaptation module. The adaptation module is configured to derive, using a stochastic gradient process, the compensator coefficients, including to select, according to a pseudo-random buffer selection process, at least one location of the selection buffer to access at least one of the plurality of observed output samples stored in the selection buffer, compute updated values for the compensator coefficients based on current intermediate values for the compensator coefficients and a sub-gradient value computed according to a sub-gradient of an error function representing a relationship between the at least one of the plurality of observed output samples at the pseudo-randomly selected location of the selection buffer, and at least one or more input data samples, or one or more intermediary samples produced by the digital compensator, corresponding to the at least one of the plurality of observed output samples stored at the pseudo randomly selected location of the selection buffer. The adaptation module configured to derive the compensator coefficients is further configured to repeat the selecting to select a subsequent at least one location of the selection buffer, according to the buffer selection pseudo-random process, to access a subsequent at least one of the plurality of observed output samples, and compute updated values for the plurality of the sets of coefficients based, at least in part, on the subsequent at least one of the plurality observed output samples. The adaptation module configured to derive the compensator coefficients is additionally configured to replace, at a time instance determined independently of the pseudo-random buffer selection process, at least a portion of the plurality of observed output samples stored in the selection buffer with a different set of observed output samples, corresponding to a different set of input samples provided to the digital compensator.

Embodiments of the additional linearization system may include at least some of the features described in the present disclosure, including any of the features of the above methods, the first linearization system, the design structures, and the computer readable medium.

In some variations, a design structure is provided that is encoded on a non-transitory machine-readable medium, with the design structure including elements that, when processed in a computer-aided design system, generate a machine-executable representation to fabricate hardware of one or more of the system modules and circuits described above.

In some variations, an integrated circuit definition dataset that, when processed in an integrated circuit manufacturing system, configures the integrated circuit manufacturing system to manufacture one or more of the system modules and/or circuits described above.

In some variations, a non-transitory computer readable media is provided that is programmed with a set of computer instructions executable on a processor that, when executed, cause the operations comprising the various method steps described above.

Embodiments of the design structures, the integrated circuit definition datasets, and the computer-readable media may include at least some of the features described in the present disclosure, including at least some of the features described above in relation to the methods, the linearization systems, the media, and/or the design structures.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Disclosed are systems, devices, methods, media, design structures, IC's, and other implementations for a buffer management approach that facilitates a stochastic gradient methodology to minimize a regularized mean square error to compute DPD coefficients applied to basis functions (also referred to as "transformation functions") used in digital predistortion implementations. In some examples, a method is provided that includes selecting at least one location of a selection buffer, storing a plurality of observed output samples obtained from one or more of output batches produced by a signal chain, according to a pseudo-random buffer selection process, and accessing at least one observed output sample. The at least one observed output sample is generated in response to corresponding one or more input samples provided to a digital compensator applying to one or more input batches a plurality of basis functions, weighed by compensator coefficients, to produce intermediary samples, with the one or more intermediary samples provided to the signal chain. The method further includes computing an approximation of a sub-gradient value computed according to a stochastic gradient process to derive a sub-gradient of an error function representing a relationship between the accessed at least one observed output sample stored in the pseudo randomly selected at least one location of the selection buffer, and at least one of, for example, the corresponding one or more or more input samples, or one or more intermediate samples, produced by the digital compensator, corresponding to the pseudo randomly selected at least one location of the selection buffer storing the at least one observed output sample. The method further includes computing updated values for the compensator coefficients based on current values of the compensator coefficients and the computed approximation of the sub-gradient value computed according to the sub-gradient of the error function, and replacing, at a time instance determined independently of the pseudo-random buffer selection process, content of at least a portion of the selection buffer with different one or more observed output samples responsive to one or more other input samples.

In some additional examples, a linearization system is disclosed that includes a signal chain comprising at least one analog electronic amplification element, with the signal chain producing output signals including non-linear distortions, a digital compensator to compensate for non-linear behavior of the signal chain by applying a plurality of basis functions weighed by compensator coefficients to input signals to the compensator resulting in intermediary samples provided as input to the signal chain, an observation receiver to produce observed output samples of the output signals produced by the signal chain, a selection buffer to store a plurality of the observed output samples, and an adaptation module (also referred to as an adaptation unit or adaptor). The adaptation module is configured to select at least one location of the selection buffer, according to a pseudo-random buffer selection process, and access at least one observed output sample. The adaptation module is also configured to compute an approximation of a sub-gradient value computed according to a stochastic gradient process to derive a sub-gradient of an error function representing a relationship between the accessed at least one observed output sample stored in the pseudo randomly selected at least one location of the selection buffer, and at least one of, for example, corresponding one or more or more input samples, and/or corresponding one or more intermediate samples produced by the digital compensator in response to the one or more input samples. The adaptation module is further configured to compute updated values for the compensator coefficients based on current values of the compensator coefficients and the computed approximation of the sub-gradient value computed according to the sub-gradient of the error function, and replace, at a time instance determined independently of the pseudo-random buffer selection process, content of at least a portion of the selection buffer with different one or more observed output samples responsive to one or more other input samples.

In some embodiments, the implementations described herein may be configured to fill in the data buffers, and a DPD estimation (adaptation) unit can processes the data in a random fashion while updating the DPD coefficients. In some such embodiments, the implementations are configured to, at an arbitrary time, flush out old data and refill the buffers with new data (sequentially, to preserve the order of the new samples) to be processed by the estimation unit. This is repeated during the operation of the system. The estimation unit can either stay agnostic to the data refresh process, or use a trigger or flag to indicate that existing data has been processed and the estimation unit is ready to accept new data.

Figure 1:
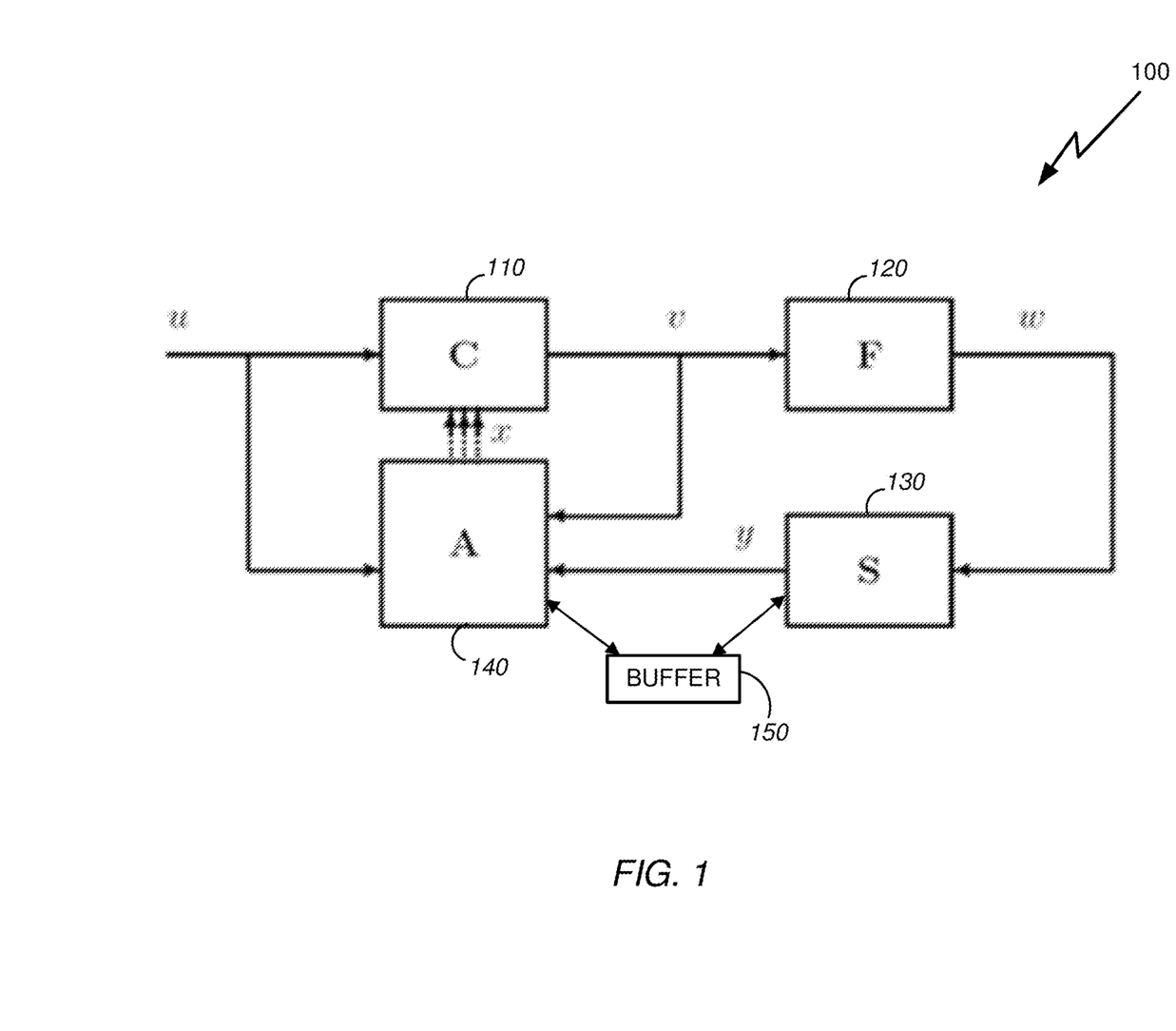
FIG. 1 is a block diagram of a linearization system that uses buffer control processes to implement adaptive digital predistortion based on a stochastic gradient approach.

Thus, with reference to FIG. 1, a block diagram of a linearization system 100, implementing adaptive digital predistortion compensation (applied, in particular, to digital RF transmission) using a stochastic gradient approach, is shown. A signal u, which is an input baseband signal that is to be transmitted (with u comprising a sequence . . . , u[t−1], u[t], u[t+1], . . . of, for example, complex samples), is provided to a digital predistorter 110, identified as block C, configured to compensate for non-linear behavior of a power amplifier. An intermediary, predistorted output of C, namely the signal v, is provided to a digital-to-analog subsystem 120 (identified as block F) representing, for example, a DAC/PA combination (other components, which may contribute to non-linear behavior of F, may also be included with the digital-to-analog subsystem 120). The subsystem 120 is also referred to as signal chain or transmit chain.

As further illustrated in FIG. 1, an analog-to-digital sub-system 130 (identified as a block S) represents real time output measurement (for example, a demodulator/ADC combination) of the output, w, of the block F (the subsystem 120). The analog-to-digital subsystem 130 (block S) is also referred to as the observation path. The block S produces observed digital samples denoted as the signal y. In some embodiments, at least a batch of the observed samples is stored in a buffer(s) 150 that is in electrical communication with the subsystem 120. As will be discussed in greater detail below, at least one observed output sample, corresponding to at least one input sample provided as input to the digital predistorter 110 (the block C) and/or at least one intermediary predistorted sample (from the signal v) may also be stored on the buffer 150, and be accessible by an adaptation module 140 to derive (using for example, a subgradient approach to minimize an Error function) DPD coefficients that are used to weigh basis functions applied to incoming input samples.

As depicted in FIG. 1, samples of the intermediary signal v and the observed samples y are provided to the adaptation module 140 (identified as block A, and also referred to as adaptation unit or adaptor) which implements an adaptation process to derive a vector x of the coefficients of C, based on the information provided by v, y, and, in some instances, u. The observed samples y, as well as the intermediary samples v and/or the input samples u, may also be stored in the buffer 150. The storing of data (input or output samples) on the buffer 150 is a process that is independent of the process for accessing stored content. Thus, the content of the buffer (or a portion thereof) may be replaced regardless of how much the current content has been used (the content on the buffer may not have been used at all, or may have been re-accessed several times, at the time the buffer is flushed and replaced with new content). New content may be stored on the buffer when it becomes available at some remote device or by some third party that does not coordinate content transfer with the system implementation of the system 100. New content may, in some embodiments, be provided for storage on the buffer at time instances determined independently of the process (es) used to access the buffer or otherwise compute DPD coefficients. The process for accessing the stored content on the buffer may be implemented as a pseudo-random process to select buffer locations, and access the locations so selected. The buffer 150 may be integrated into the circuitry comprising either the adaptation module 140 or the observation path circuitry (block S), or may alternatively be a separate module in electrical communication with the block S and/or the adaptation module A (as well as with any of the other circuits, modules, and/or units of the system 100).

The system 100 illustrated in FIG. 1 may be at least part of a digital front end of a device or system (such as a network node, e.g., a WWAN base station or a WLAN access point, or of a mobile device). As such, the system 100 may be electrically coupled to communication modules implementing wired communications with remote devices (e.g., via network interfaces for wired network connection such as through ethernet), or wireless communications with such remote devices. In some embodiments, the system 100 may be used locally within a device or system to perform processing (predistortion processing or otherwise) on various signals produced locally in order to generate a resultant processed signal (whether or not that resultant signal is then communicated to a remote device).

In some embodiments, at least some functionality of the linearization system 100 (including the updating of DPD coefficients based on the stochastic subgradient approach) may be implemented using a controller (e.g., a processor-based controller) included with one or more of the modules of the system 100 (the compensator 110, the adaptation module 140, or any of the other modules of the system 100). The controller may be operatively coupled to the various modules or units of the system 100, and be configured to compute approximations of the gradient of the error function (as will be discusses in greater detail below), update DPD coefficients based on those approximations, and perform digital predistortion using the continually updated DPD coefficients. The controller may include one or more microprocessors, microcontrollers, and/or digital signal processors that provide processing functionality, as well as other computation and control functionality. The controller may also include special purpose logic circuitry, e.g., an FPGA (field programmable gate array), an ASIC (application-specific integrated circuit), a DSP processor, a graphics processing unit (GPU), an accelerated processing unit (APU), an application processor, customized dedicated circuitry, etc., to implement, at least in part, the processes and functionality for the system 100. The controller may also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

As noted, the coefficients derived by the block A are used to weigh the basis functions (transformation functions) used by block C to predistort the input u. Predistorting the signal u, by the digital predistorter 110 requires, in some embodiments, making the difference between y and u as small as possible.

A common representation of the compensator C (the subsystem 110 of FIG. 1) is given by C:

$$v[t] = u[t] + \sum_{k=1}^{n} x_k B_k(q_u[t], p[t])$$

where $$q_u[t] = \begin{bmatrix} u[t+l-1] \\ u[t+l-2] \\ \vdots \\ u[t+l-\tau] \end{bmatrix},$$

is the stack of recent (around t) baseband input samples, and, in some embodiments, p[t] is d-dimensional real vector of environmental parameters at time t (e.g., VDD and temperature, in which case d=2), $x_k$ (k=1, . . . , n) are the elements of a complex n-dimensional vector $x \in C^n$ (the coefficients of the compensator), and $B_k(q,p)$ are carefully selected "basis functions" of τ-dimensional complex vector q and d-dimensional real vector p (a "careful" selection means that the operation of computing a single sample v[t] of the corrected signal takes significantly less than n scalar multiplications). An example of a compensator, such as the compensator implemented in block C, operating according to an inverse model of the nonlinear distortion of the transmit chain (e.g., realized in the block F) and using basis functions weighed by regularly updated DPD coefficients, includes a compensator such that providing the input signal, u, causes the compensator to generate the intermediate input signal, v as follows:

$$v = 2u + \sum_{i=1}^{n} x_i f_i(u)$$

where $f_i(\cap)$ is the $i^{th}$ basis function of n basis functions and $x_i$ is the $i^{th}$ parameter (e.g., the $i^{th}$ weight) corresponding to the $i^{th}$ basis function. Each basis function, in this example, is a linear function (e.g., u(t−1)) or a non-linear function (e.g., $|u(t)|^2$) of the input, u, which may include memory (e.g., u(t)*u(t−1)).

In some implementations, the adaptation process adjusts the coefficients set of coefficients, $x_k$ (where k represents a time instance or interval during which that set $x_k$ is being used) of the predistorter by observing the measurement samples y[t] and trying to minimize the regularized mean square error according to:

$$E(x) = \rho|x|^2 + \frac{1}{N} \sum_{t \in T} \left| e[t] - \sum_{k=1}^{n} x_k B_k(q_y[t], p[t]) \right|^2,$$

where $$q_y[t] = \begin{bmatrix} y[t+l-1] \\ y[t+l-2] \\ \vdots \\ y[t+l-\tau] \end{bmatrix},$$

In the above expression, e[t]=v[t]−y[t] is the input/output mismatch in the observed data, ρ>0 is the regularization factor (used to prevent poor conditioning of the optimization problem, which tends to result in unstable interaction between the adaptation process and the compensator application, as well as unreasonably large entries of the optimal x*=argmin E(x)), T={t} is a set of time samples, N is the number of elements in T. Equivalently, the function E=E(x) to be minimized can be expressed in the form:

$$E(x) = \rho|x|^2 + \frac{1}{N} \sum_{t \in T} |e[t] - a[t]x[t]|^2 = R + 2\text{Re}[L'x] + x'Gx + \rho|x|^2,$$

where a[t]=[$B_1(q_y[t],p[t])$, $B_2(q_y[t],p[t])$, . . . , $B_n(q_y[t],p[t])$] are the complex 1-by-n matrices formed by the basis function samples, and $$G = \frac{1}{N} \sum a[t]'a[t], \quad L = \frac{1}{N} \sum a[t]'e[t], \quad R = \frac{1}{N} \sum |e[t]|^2$$

are the components of the Gramian matrix computed from the data.

As time progresses, the data represented by the samples ($q_y[t]$,p[t],e[t]), t∈T, gets refreshed with the outcomes of new measurements. This is usually done by either re-computing the Gramian, or by averaging new and old Gramians, or by replacing the old $(q_y[t],p[t],e[t])$ samples with the new ones. As noted, in some embodiments, the process to replace or refresh a buffer holding sample data is performed independently of any of the processes that access the buffer (e.g., including the processes to compute DPD coefficients). In some example implementations, the adaptation process used for a DPD implementation attempts to find the vector x of compensator coefficients as an approximation of the optimal $x_*=\text{argmin } E(x)$.

An approach to finding $x_*=\text{argmin } E(x)$ is by computing it as the (unique) solution $x_* (\rho I_n+G)^{-1}L$ of the linear equation $(\rho I_n+G)x=L$, where $I_n$ denotes the n-by-n identity matrix. This approach requires computation (and storage) of the n-by-n Hermitian matrix G, which makes it impractical even for very simple compensators (for example, a compensator with n=100 complex coefficients will require computing and storing $n^2=10000$ real coefficients of G). In addition, solving large systems of linear equations on FPGA or ASIC is a challenge on its own, and does not resolve the challenge of large storage required for Gramians of all but very simple DPD compensators. Additional details describing DPD adaptation processes (including use of Gramians to derive DPD coefficients) is discussed in U.S. patent application Ser. No. 16/004,594 entitled "Linearization System," Ser. No. 16/408,979 entitled "Digital Compensator for a Non-Linear System," Ser. No. 16/422,448 entitled "Digital Predistortion in Varying Operating Conditions," and Ser. No. 16/656,686 entitled "Multi-Band Digital Compensator for a Non-Linear System," the contents of all of which are incorporated herein by reference in their entireties.

The gradient of $E=E(x)$ at a point $x \in C^n$ is given by:

$$\nabla E(x) = 2(\rho x + Gx - L) = 2\left[\rho x + \frac{1}{N}\sum_{t \in T} a[t]'(a[t]x - e[t])\right],$$

and can be computed and stored as an n-by-1 complex matrix, which reduces the storage requirements, compared to those of the Gramian.

Once computed, the gradient can be used to adjust the current guess $\tilde{x}$ at the optimal x, according to $\tilde{x}^+=\tilde{x}-\gamma\nabla E(z)$, making it slightly better (as long as the step size parameter y is sufficiently small). With the updated guess $\tilde{x}=\tilde{x}^+$ the optimal x, the gradient can be re-computed, and another adjustment can be made. Repeating the process sufficiently many times leads to an arbitrarily accurate approximation $\tilde{x}$ of $x_*$. Thus, in approaches based on a gradient of the error function $E(x)$, a new/subsequent set of coefficients to weigh the basis functions applied by the compensator (e.g., the compensator realized by the block C) can be estimated/approximated as a change of the current coefficients by a pre-determined multiple (i.e., a step-size $\gamma$) of the value of the gradient of $E(x)$.

Re-computing the gradient requires a significant number of operations each time. Since the number of steps of gradient search, before it reaches a satisfactory level of optimality, tends to be significant, compensator adaptation based on gradient search may be slow.

Accordingly, to reduce the amount of computation required to derive a current value of the gradient of $E(x)$ (based on which updated coefficients are to be computed), in some embodiments, a sub-gradient approach to minimize $E(x)$ may be used to approximate the DPD coefficients x. Particularly, a stochastic gradient approach to minimize the function $E=E(x)$ is implemented based on the fact that the gradient $\nabla E(x)$ is the expected value of the vector random variable, $$\xi=2[\rho x + a[\tau]'(a[\tau]x - e[\tau])],$$

where $\tau$ is the random variable uniformly distributed on the finite set $T=\{t\}$, and that random samples of $\xi$ which are much cheaper, from a computational effort, to compute than the true gradient $\nabla E(x)$) can replace $\nabla E(x)$ in the gradient search iterations without a significant loss of convergence rate. In the above expression, $a[\tau]$ represents a matrix of values resulting from application of the basis functions, as weighed by the DPD coefficients x, to the input sample(s) at a randomly selected instant corresponding to the random variable $\tau$, and $e[\tau]$ is the input/output mismatch in the observed data between an output of an observer receiver and the output of the digital compensator (e.g., the output y of the block S, and the output v of the block C depicted in FIG. 1).

Thus, a modified version of the stochastic gradient approach, involves constructing a sequence of random values $\tilde{x}_0, \tilde{x}_1, \ldots$ (taking values in $C^n$), and updating the current coefficients at an instance k (namely, $\tilde{x}_k$) as follows:

$$\tilde{x}_{k+1}=\tilde{x}_k+\alpha a[\tau_k]'(e[\tau_k]-a[\tau_k]\tilde{x}_k)-\alpha\rho\tilde{x}_k, \tilde{x}_0=0,$$

where $\tau_1, \tau_2, \ldots, \tau_n$ are independent random variables uniformly distributed on $T=\{t\}$, $\rho>0$ is the regularization constant from the definition of $E=E(x)$, and $\alpha>0$ is a pre-determined multiple (which may be a constant value that can be adjusted at regular or irregular periods) such that $\alpha(\rho+|a[t]|^2)<2$ for every $t \in T$. The pre-determined value a represents the step size that is applied to a value based on the expected value of the vector random variable used to approximate the gradient $\nabla E(x)$. It is to be noted that, in some embodiments, the random sequence $\tau_1, \tau_2, \ldots, \tau_n$ needs to navigate through all available samples in the set T.

The expected value $\bar{x}_k=E[\tilde{x}_k]$ can be shown to converge to $x_*=\text{argmin } E(x)$ as $k\to\infty$. An averaging operation may be used according to the expression:

$$\tilde{y}_{k+1}=\tilde{y}_k+\epsilon(\tilde{x}_k-\tilde{y}_k), \text{ with } \epsilon \in (0,1].$$

The difference between $\tilde{y}_k$ and $x_*$ is small for large k, as long as $\epsilon>0$ is small enough. This approach to minimize $E(x)$ is referred to as a "projection" method, since the map, $$x \to x + |a[t]|^{-2} a[t]'(e[t] - a[t]x[t])$$

projects x onto the hyperplane $a[t]x=e[t]$.

In practical implementations of the processes to compute approximation of the gradient of $E(x)$, and to thus update the current coefficients, $\tau_k$ are generated as a pseudo-random sequence of samples, and the calculations of $\tilde{y}_k$ can be eliminated (which formally corresponds to $\epsilon=1$, i.e., $\tilde{y}_k=\tilde{x}_{k+1}$). As a rule, this requires using a value of a with smaller minimal upper bound for $\alpha(\rho+|a[t]|^2)$ (for example, $\alpha(\rho+|a[t]|^2)<1$, or $\alpha(\rho+|a[t]|^2)<0.5$).

In some embodiments, the values of a is sometime adjusted, depending on the progress made by the stochastic gradient optimization process, where the progress is measured by comparing the average values of $|e[\tau_k]|$ and $|e[\tau_k]-a[\tau_k]\tilde{x}_k|$. In some embodiments, a regular update of the set of the optimization problem parameters $a[t], e[t]$ may be performed to replace the data samples $a[t], e[t]$ observed in the past with new observations.

Thus, in the implementations described herein, a batch of observed outputs (i.e., outputs of the observation receiver 130 implemented in the block S) are stored in a buffer (such as the buffer 150 of the system 100 of FIG. 1). Likewise, input samples (e.g., of the signal u, and possibly the output v of the compensator block C) that correspond to the stored batch of observed output samples, may also be stored in the buffer (or, alternatively, in some other storage device). As noted, storage of samples on the buffer is generally based on a buffer content replacement process that is independent of any other process used in the course of determining digital predistortion coefficients. For example, the buffer content replacement process is independent of the process for accessing the buffer and utilizing the content so accessed to compute approximations of sub-gradient values. To derive an updated set of DPD coefficients based on the stochastic gradient approaches described herein, at least one location of the buffer storing an observed output sample(s) is pseudo-randomly selected, from a plurality of observed output samples stored in a selection buffer (such as the buffer 150), and updated values for the set of DPD coefficients are computed based on the current intermediate values for the current set of DPD coefficients and a sub-gradient value computed according to a sub-gradient of an error function representing a relationship between the pseudo randomly selected observed output sample(s), and at least one or more input data samples corresponding to the pseudo randomly selected observed output sample. This process is repeated, at periodic or aperiodic time intervals (e.g., realized through a pseudo-random selection process) to select a subsequent (generally different) observed output sample(s) from the selection buffer, and computing updated values for the set of DPD coefficients based, at least in part, on the different observed output sample (and its corresponding input samples and/or intermediary samples produced by the digital compensator). Additionally, as noted, at least some of the plurality of observed output samples stored in the selection buffer are replaced with a different set of observed output samples at a time instance that is determined independently of the pseudo-random selection process used to select buffer locations whose content is retrieved to facilitate the stochastic gradient computation performed to derive DPD coefficients. Thus, the buffer 150 is managed/controlled through at least these two independent processes to achieve an efficient buffer management implementation (where the need for coordination between different processes making use of the buffer is reduced or altogether eliminated). The independence of these two processes also results in better stochastic sub-gradient approximation because of the enhanced randomness realized from using these two independent processes. In some embodiments, the buffer management process implementation may be based on filling the buffer(s) (which does not necessarily need to be engineered as a random process, but may instead be performed upon the scheduled or unscheduled completion of the processing of the current buffer content), processing the new data in the buffer in a random fashion, updating the coefficients, flushing out the old data (once it has been processed), and refilling the buffers with new data (the refilling may be performed sequential so as to preserve the order of the newly arrived data in the vacated storage in the buffer). This process may then be repeated for the next batch of sequentially available data.

As discussed herein, because the DPD coefficients are dynamically updated (reflecting the fact that the behavior of the system 100 changes over time), the expected values for the vector random value $\xi$ represents a good approximation or estimate for the gradient $\nabla E(x)$, thus allowing for cheaper computation (from a computational effort perspective) of the values used to update the DPD coefficient x used by the compensator of the system 100.

As noted, in some embodiments, the value of the step size (that multiplies the approximation determined for the gradient $\nabla E(x)$) may be adjusted based on a measure of progress of the stochastic gradient process, with the measure of progress being determined by, for example, comparing an average values of $|e[\tau_k]|$ and $|e[\tau_k]-a[\tau_k]\tilde{x}_k|$. In some examples the process starts off with a relatively larger step size and then gradually reduces the step size.

Figure 2:
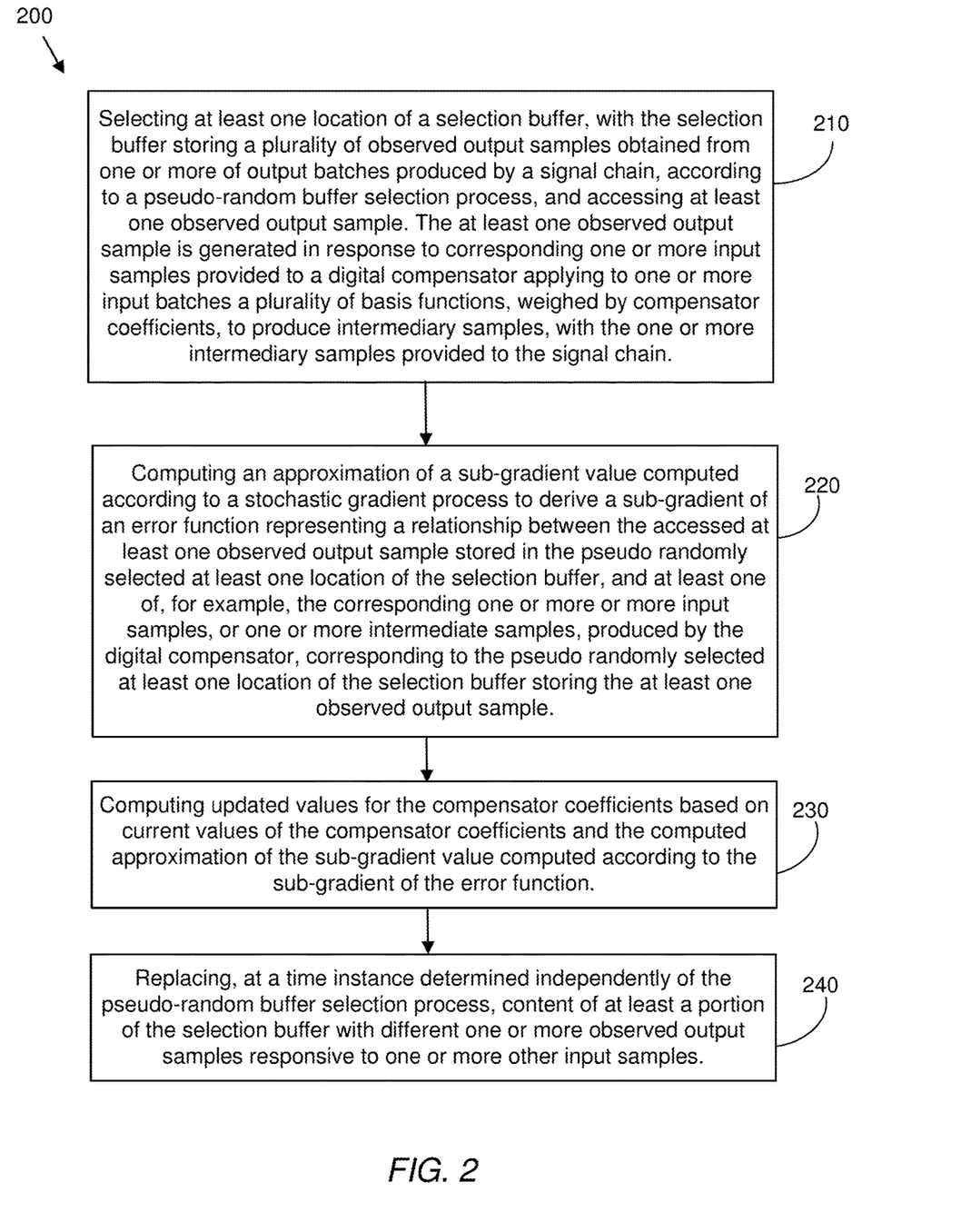
FIG. 2 is a flowchart of an example procedure to facilitate implementation of digital compensation.

With reference now to FIG. 2, a flowchart of an example procedure 200 to facilitate implementation of digital compensation (to digitally compensate, using block C, a signal provided to a signal chain exhibiting non-linear behavior, with the signal chain comprising at least one analog electronic amplification element) is shown. The procedure 200 may be performed at a network node (such as a WLAN access point or a WWAN base station) or at a mobile device in communication with a network node. The procedure 200 includes selecting 210 at least one location of a selection buffer (such as the location buffer 150 depicted in FIG. 1), with the selection buffer storing a plurality of observed output samples obtained from one or more of output batches produced by a signal chain, according to a pseudo-random buffer selection process, and accessing (also at 210) at least one observed output sample. The at least one observed output sample is generated in response to corresponding one or more input samples provided to a digital compensator applying to one or more input batches (from an input signal u) a plurality of basis functions, weighed by compensator coefficients, to produce intermediary samples (e.g., corresponding to the signal v illustrated in FIG. 1), with the one or more intermediary samples provided to the signal chain. The input signal processed by the compensator C may be received via one or more of, for example, a wired communications interface (e.g., a wired network transceiver implemented, for example, according to the Data Over Cable Service Interface Specification (DOCSIS) communications standard, or according to any other wired communication standard or protocol), or a wireless communication interface (e.g., wireless transceiver). For example, if the input signal is not produced locally at a baseband unit, the signal may be communicated to the system 100 (which may be part of a network node, such as a WWAN base station) through a wired or wireless communication interface.

With continued reference to FIG. 1, the procedure 200 also includes computing 220 an approximation of a sub-gradient value computed according to a stochastic gradient process to derive a sub-gradient of an error function representing a relationship between the accessed at least one observed output sample stored in the pseudo randomly selected at least one location of the selection buffer, and at least one of, for example, the corresponding one or more or more input samples, and/or one or more intermediate samples, produced by the digital compensator, corresponding to the pseudo randomly selected at least one location of the selection buffer storing the at least one observed output sample. That is, the derivation of the approximation of the sub-gradient value may be based on the output samples (that are selected pseudo-randomly by applying a pseudo-random process to select at least one location of the selection buffer), and corresponding samples of the input signal u or the intermediate signal v.

Having computed the sub-gradient value approximation, the procedure 200 next includes computing 230 updated values for the current compensator coefficients based on current values of the compensator coefficients and the computed approximation of the sub-gradient value computed according to the sub-gradient of the error function.

In some embodiments, computing the updated values for the compensator coefficients may include computing the updated values for the current values of the compensator coefficients based on a sum of the current values of the compensator coefficients and a product of a pre-determined multiple, representative of a step size, and the approximation of the sub-gradient value computed according to the sub-gradient of the error function. In some such examples, computing the updated values for the compensator coefficients may include deriving the updated values for the compensator coefficients according to the relationship:

$$\tilde{x}_{k+1} = \tilde{x}_k + \alpha a[\tau_k]'(e[\tau_k] - a[\tau_k]\tilde{x}_k) - \alpha \rho \tilde{x}_k, \text{with } \tilde{x}_0 = 0,$$

where $\tilde{x}_k$ are the current values of the compensator coefficients, $\tilde{x}_{k+1}$ are the updated compensator coefficients, $\tau_1$, $\tau_2, \ldots, \tau_n$ are independent random variables uniformly distributed on $T=\{t\}$, $a[\tau]$ represents a matrix of values resulting from application of the basis functions at time $\tau$ to the one or more input samples corresponding to the pseudo randomly selected observed output sample, $e[\tau]$ is input/output mismatch in the observed data between an output of an observer receiver and the output of the digital compensator, $\rho>0$ is a regularization constant, and $\alpha>0$ is a value representative of the step size, such that $\alpha(\rho+|a[t]|^2)<A$ for every $t \in T$, where A is some pre-specified constant value.

In some embodiments, the procedure 200 may further include adjusting the value of $\alpha$ representative of the step size based on a measure of progress of the stochastic gradient process, with the measure of progress being determined by comparing an average values of $|e[\tau_k]|$ and $|e[\tau_k] - a[\tau_k]\tilde{x}_x|$.

Turning back to FIG. 2, the procedure 200 additionally includes replacing 240, at a time instance determined independently of the pseudo-random buffer selection process, content of at least a portion of the selection buffer with different one or more observed output samples responsive to one or more other input samples. Since the replacement process and buffer selection process are independent of each other, the content of the selection buffer (or a portion thereof) may be replaced without any regard to whether, or how many times, the current content of the buffer has been accessed (e.g., through pseudo-random selections of buffer locations). Thus, the content of the buffer may be flushed without the current buffer having been accessed even once in the course of computing sub-gradient value approximations. Conversely, the same buffer content may persist for a relatively long period of time, with some locations of the buffer (containing respective input and output samples) possibly being accessed more than once in the course of computing sub-gradient value approximations. In some embodiments, each current samples stored in the buffer may need to be accessed at least once before at least a part of the buffer may be replaced with new data.

The delivery of new content of observed output sample for storage in the selection buffer may be done according to some local or remote scheduling, according to discrete individual decisions, deterministic or non-deterministic decision-making processes, or based on any criterion that is generally unrelated to, and is independent of, the buffer location selection process used for selecting the output and input samples in the buffer. Thus, in some embodiments, replacing, at the time instance determined independently of the pseudo-random buffer selection process, the content of the at least the portion of the selection buffer may include replacing the content of the at least the portion of the selection buffer based on one or more of, for example: i) receipt of a replacement signal (e.g., a local signal generated locally at the device performing the digital compensation processing, or a remote signal received from a remote device providing new data) indicating availability of the different one or more replacement observed output samples responsive to the one or more other input samples, ii) scheduled arrival of the different one or more replacement observed output samples responsive to the one or more other input samples (e.g., the arrival of new data may signal to a local controller that the content of the buffer needs to be, at least partly, replaced), and/or iii) unscheduled arrival at an arbitrary time instance of the different one or more replacement observed output samples responsive to the one or more other input samples. In some examples, the provisioning of new samples may be provided due to changing conditions (environmental conditions, operating points, etc.) As noted, in some implementations, the content replacement procedure may require that every current sample in the buffer needs to be accessed at least once before the buffer (or a part thereof) can be replaced. In some embodiments, replacing the content of the at least the portion of the selection buffer may include replacing the at least the portion of the selection buffer according to a pseudo-random replacement process, independent of the pseudo-random buffer selection process, to populate the at least the portion of the selection buffer with the different one or more replacement observed output samples and corresponding one or more other input samples.

In some examples, replacing the at least the portion of the selection buffer may include flushing the at least the portion of the selection buffer storing the plurality of observed output samples, and filling the at least the portion of the flushed selection buffer with the different one or more replacement observed output samples responsive to the one or more other input samples. In some variations, replacing the at least the portion of the selection buffer may include replacing according to the pseudo-random replacement process the entire selection buffer storing the plurality of observed output samples, with a different set of observed output samples, corresponding to a different set of input samples provided to the digital compensator.

As noted, the process of selection buffer locations whose content is then used for computing sub-gradient value approximations is repeated to pseudo-randomly select subsequent buffer location. The repeating may be performed at regular (e.g., periodic) or irregular (e.g., aperiodic) intervals, and the length of interval between the repeating of the buffer location process may itself be based on some pseudo-random factor or process that is independent of any other process used in the implementations of the procedures illustrated in FIG. 2. Accordingly, in some embodiments, the procedure 200 may further include repeating the pseudo-random buffer selection process to select a subsequent (generally different) at least one buffer location to access a different at least one observed output sample from the selection buffer, and computing updated values for the compensator coefficients based, at least in part, on the different at least one observed output sample.

In some embodiments, the procedure 200 of FIG. 2 may also include one or more of communicating the output signal of the signal chain to a remote device via one or more of: a wired communications interface, or a wireless communication interface, and/or receiving the input signal via one or more of: the wired communications interface, or the wireless communication interface.

Figure 3:
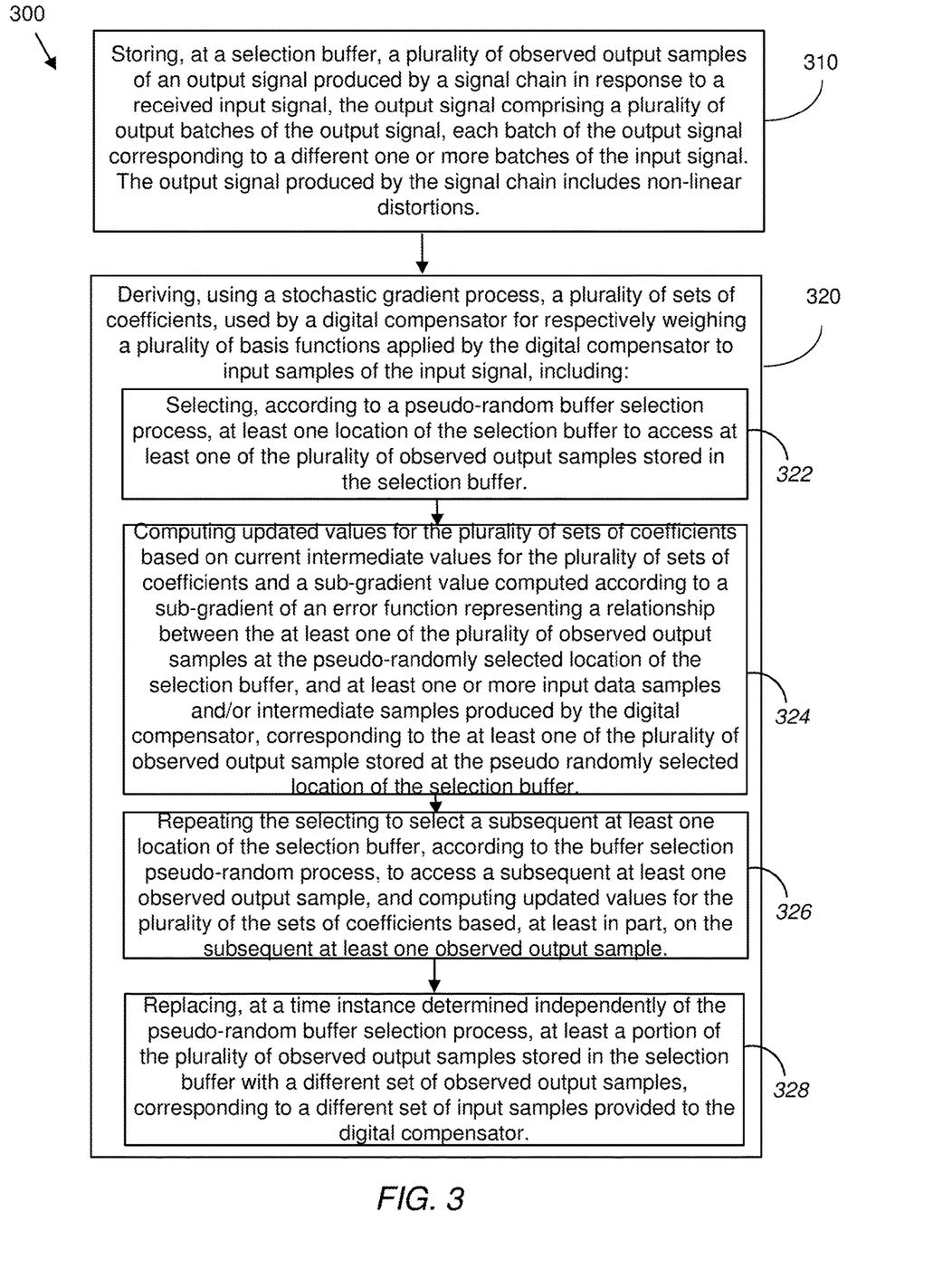
FIG. 3 is a flowchart of an example procedure illustrating buffer management to facilitate digital compensation implementation using a stochastic gradient approach.

FIG. 3 is a flowchart of an example procedure 300 illustrating buffer management to facilitate digital compensation performed on an input signal provided to a system with a signal chain causing non-linear distortions responsive to the input signal. At least part of the procedure 300 may be implemented similarly to the procedure 200 of FIG. 2. The procedure 300 includes storing 310, at a selection buffer (e.g., such as the buffer(s) 150 of FIG. 1), a plurality of observed output samples of an output signal produced by the signal chain in response to a received input signal (e.g., the digitized observed output, y, produced from the analog output w of the transmit chain 120 realized in block F). The output signal includes a plurality of output batches of the output signal, with each batch of the output signal corresponding to a different one or more batches of the input signal. As noted, the output signal produced by the signal chain typically includes non-linear distortions.

The procedure 300 further includes deriving 320, using a stochastic gradient process, a plurality of sets of coefficients used by a digital compensator for respectively weighing a plurality of basis functions applied by the digital compensator to input samples of the input signal. Deriving the plurality of sets of coefficients using the stochastic gradient process includes selecting 322, according to a pseudo-random buffer selection process, at least one location of the selection buffer to access at least one of the plurality of observed output samples stored in the selection buffer.

The derivation of the plurality of sets of coefficients also includes computing 324 updated values for the plurality of sets of coefficients based on current intermediate values for the plurality of sets of coefficients and a sub-gradient value computed according to a sub-gradient of an error function representing a relationship between the at least one of the plurality of observed output samples at the pseudo-randomly selected location of the selection buffer, and at least one or more input data samples, and/or intermediary values produced by the digital compensator, corresponding to the at least one of the plurality of observed output samples stored at the pseudo randomly selected location of the selection buffer. In some embodiments, computing the updated values for the plurality of sets of coefficients may include computing the updated values for the plurality of sets of coefficients based on the current intermediate values for the plurality of sets of coefficients and a pre-determined multiple, representative of a step size, of the sub-gradient value computed according to the sub-gradient of the error function using the accessed at least one observed output sample and the at least one or more input data samples corresponding to the at least one observed output sample. For example, in some such embodiments, computing the updated values for the plurality of sets of coefficients may include deriving the updated values for the plurality of sets of coefficients according to the relationship:

$$\tilde{x}_{k+1} = \tilde{x}_k + \alpha a[\tau_k]'(e[\tau_k] - a[\tau_k]\tilde{x}_k) - \alpha \rho \tilde{x}_k, \text{with } \tilde{x}_0 = 0,$$

where $\tau_1, \tau_2, \ldots, \tau_n$ are independent random variables uniformly distributed on $T=\{t\}$, $a[\tau]$ represents a matrix of values resulting from application of the basis functions at time $\tau$ to the input samples corresponding to the pseudo randomly selected observed output sample, $e[\tau]$ is input/output mismatch in the observed data between an output of an observer receiver and the output of the digital compensator, $\rho > 0$ is a regularization constant, and $\alpha > 0$ is a value representative of the step size, such that $\alpha(\rho + |a[t]|^2) < A$ for every $t \in T$, where A is some pre-specified constant value.

In some embodiments, the procedure 300 may further include adjusting the value of $\alpha$ representative of the step size based on a measure of progress of the stochastic gradient process, with the measure of progress being determined by comparing an average values of $|e[\tau_k]|$ and $|e[\tau_k] - [\tau_k]\tilde{x}_k|$.

With continued reference to FIG. 3, the procedure 300 further includes repeating 326 the selecting to select a subsequent at least one location of the selection buffer, according to the buffer selection pseudo-random process, to access a subsequent (generally different) at least one observed output sample, and computing updated values for the plurality of the sets of coefficients based, at least in part, on the subsequent at least one observed output sample.

The procedure 300 also includes replacing 328, at a time instance determined independently of the pseudo-random buffer selection process, at least a portion of the plurality of observed output samples stored in the selection buffer with a different set of observed output samples, corresponding to a different set of input samples provided to the digital compensator.

In some embodiments, replacing, at the time instance determined independently of the pseudo-random buffer selection process, the at least the portion of observed output samples may include replacing the at least the portion of observed output samples based on one or more of, for example: i) receipt of a replacement signal indicating availability of the different set of observed output samples corresponding to the different set of input samples, ii) scheduled arrival of the different set of observed output samples corresponding to the different set of input samples, and/or iii) unscheduled at an arbitrary time instance arrival of the different set of observed output samples corresponding to the different set of input samples. In some examples, replacing the at least the portion of the plurality of observed output samples may include replacing the selection buffer according to a pseudo-random replacement process, independent of the pseudo-random buffer selection process, to populate at least a portion of the selection buffer with the different set of observed output samples and corresponding replacement input samples.

As noted, in some embodiments, the input signal (marked u in FIG. 1) may have been communicated to the system 100 of FIG. 1 from a remote location. Thus, in such embodiments, the input signal may have been received via one or more of, for example, a wired communications interface (e.g., a wired network transceiver), or a wireless communication interface (e.g., wireless transceiver). For example, if the input signal is not produced locally at a baseband unit, the signal may be communicated to the system 100 (which may be part of a network node, such as a WWAN base station) through a wired or wireless communication interface. In some embodiments, the output signal w of the signal chain (block F) may be communicated to a remote device (a mobile device or a network node) via one or more of, for example a wired communications interface, or a wireless communication interface. The wired or wireless communication interfaces may be the same as, or different from, the interface(s) used to receive the input signal (e.g., in circumstances where the signal is not a locally produced baseband signal, or when the baseband signal is local but is nevertheless passed to the system 100 via a communication interface).

The above implementations, as illustrated in FIGS. 1-3, are applicable to a wide range of technologies that include RF technologies (including WWAN technologies, such as cellular technologies, and WLAN technologies), satellite communication technologies, cable modem technologies, wired network technologies, optical communication technologies, and all other RF and non-RF communication technologies. The implementations described herein encompass all techniques and embodiments that pertain to use of multiband digital predistortion in various different communication systems.

In some implementations, a computer accessible non-transitory storage medium includes a database (also referred to a "design structure" or "integrated circuit definition dataset") representative of a system including, in part, some or all of the components of a digital predistortion, DPD adaptation implementations, and/or buffer control processes described herein. Generally speaking, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represents the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, the database may itself be the netlist (with or without the synthesis library) or the data set.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for digital compensation comprising:
   selecting at least one location of a selection buffer, the selection buffer storing a plurality of observed output samples obtained from one or more of output batches produced by a signal chain, according to a pseudo-random buffer selection process, and accessing at least one observed output sample, wherein the at least one observed output sample is generated in response to corresponding one or more input samples provided to a digital compensator applying to one or more input batches a plurality of basis functions, weighed by compensator coefficients, to produce intermediary samples, with the one or more intermediary samples provided to the signal chain;
   computing an approximation of a sub-gradient value computed according to a stochastic gradient process to derive a sub-gradient of an error function representing a relationship between the accessed at least one observed output sample stored in the pseudo randomly selected at least one location of the selection buffer, and at least one of: the corresponding one or more or more input samples, or one or more intermediate samples, produced by the digital compensator, corresponding to the pseudo randomly selected at least one location of the selection buffer storing the at least one observed output sample;
   computing updated values for the compensator coefficients based on current values of the compensator coefficients and the computed approximation of the sub-gradient value computed according to the sub-gradient of the error function; and
   replacing, at a time instance determined independently of the pseudo-random buffer selection process, content of at least a portion of the selection buffer with different one or more observed output samples responsive to one or more other input samples.

2. The method of claim 1, wherein computing the updated values for the compensator coefficients comprises:
   computing the updated values for the compensator coefficients based on a sum of the current values of the compensator coefficients and a product of a pre-determined multiple, representative of a step size, and the approximation of the sub-gradient value computed according to the sub-gradient of the error function.

3. The method of claim 2, wherein computing the updated values for the compensator coefficients comprises:
   deriving the updated values for the compensator coefficients according to the relationship:

$\tilde{x}_{k+1} = \tilde{x}_k + \alpha a[\tau_k]'(e[\tau_k] - a[\tau_k]\tilde{x}_k) - \alpha \rho \tilde{x}_k$, with $\tilde{x} = 0$, where $\tilde{x}_k$ are the current values of the compensator coefficients, $\tilde{x}_{k+1}$ are the updated compensator coefficients, $\tau_1, \tau_2, \ldots, \tau_n$ are independent random variables uniformly distributed on $T = \{t\}$, $a[\tau]$ represents a matrix of values resulting from application of the basis functions at time $\tau$ to the one or more input samples corresponding to the pseudo randomly selected observed output sample, e[τ] is input/output mismatch in the observed data between an output of an observer receiver and the output of the digital compensator, ρ>0 is a regularization constant, and α>0 is a value representative of the step size, such that $\alpha(\rho+|a[t]|^2)<A$ for every t∈T, where A is some pre-specified constant value.

4. The method of claim 3, further comprising:
adjusting the value of α representative of the step size based on a measure of progress of the stochastic gradient process, wherein the measure of progress is determined by comparing an average values of $|e[\tau_k]|$ and $|e[\tau_k]-a[\tau_k]\tilde{x}_k|$.

5. The method of claim 1, further comprising:
repeating the pseudo-random buffer selection process to select a subsequent at least one buffer location to access a different at least one observed output sample from the selection buffer, and computing updated values for the compensator coefficients based, at least in part, on the different at least one observed output sample.

6. The method of claim 1, wherein replacing, at the time instance determined independently of the pseudo-random buffer selection process, the content of the at least the portion of the selection buffer comprises:
replacing the content of the at least the portion of the selection buffer based on one or more of: i) receipt of a replacement signal indicating availability of the different one or more replacement observed output samples responsive to the one or more other input samples, ii) scheduled arrival of the different one or more replacement observed output samples responsive to the one or more other input samples, or iii) unscheduled arrival at an arbitrary time instance of the different one or more replacement observed output samples responsive to the one or more other input samples.

7. The method of claim 1, wherein replacing the at least the portion of the selection buffer comprises:
flushing the at least the portion of the selection buffer storing the plurality of observed output samples; and
filling the at least the portion of the flushed selection buffer with the different one or more replacement observed output samples responsive to the one or more other input samples.

8. The method of claim 1, wherein replacing the at least the portion of the selection buffer comprises:
replacing according to the pseudo-random replacement process the entire selection buffer storing the plurality of observed output samples, with a different set of observed output samples, corresponding to a different set of input samples provided to the digital compensator.

9. The method of claim 1, further comprising one or more of:
communicating the output signal of the signal chain to a remote device via one or more of: a wired communications interface, or a wireless communication interface, or
receiving the input signal via one or more of: the wired communications interface, or the wireless communication interface.

10. A linearization system comprising:
a signal chain comprising at least one analog electronic amplification element, the signal chain producing output signals including non-linear distortions;
a digital compensator to compensate for non-linear behavior of the signal chain by applying a plurality of basis functions weighed by compensator coefficients to input signals to the compensator resulting in intermediary samples provided as input to the signal chain;
an observation receiver to produce observed output samples of the output signals produced by the signal chain;
a selection buffer to store a plurality of the observed output samples; and
an adaptation module configured to:
select at least one location of the selection buffer, according to a pseudo-random buffer selection process, and access at least one observed output sample;
compute an approximation of a sub-gradient value computed according to a stochastic gradient process to derive a sub-gradient of an error function representing a relationship between the accessed at least one observed output sample stored in the pseudo randomly selected at least one location of the selection buffer, and at least one of: corresponding one or more or more input samples, or corresponding one or more intermediate samples produced by the digital compensator in response to the one or more input samples;
compute updated values for the compensator coefficients based on current values of the compensator coefficients and the computed approximation of the sub-gradient value computed according to the sub-gradient of the error function; and
replace, at a time instance determined independently of the pseudo-random buffer selection process, content of at least a portion of the selection buffer with different one or more observed output samples responsive to one or more other input samples.

11. The system of claim 10, wherein the adaptation module configured to compute the updated values for the compensator coefficients is configured to:
compute the updated values for the compensator coefficients based on a sum of the current values of the compensator coefficients and a product of a pre-determined multiple, representative of a step size, and the approximation of the sub-gradient value computed according to the sub-gradient of the error function.

12. The system of claim 11, wherein the adaptation module configured to compute the updated values for the compensator coefficients is configured to:
derive the updated values for the compensator coefficients according to the relationship:

$$\tilde{x}_{k+1}=\tilde{x}_k+\alpha a[\tau_k]'(e[\tau_k]-a[\tau_k]\tilde{x}_k)-\alpha\rho\tilde{x}_k, \text{ with } \tilde{x}=0,$$

where $\tilde{x}_k$ are the current values of the compensator coefficients, $\tilde{x}_{k+1}$ are the updated compensator coefficients, $\tau_1, \tau_2, \ldots, \tau_n$ are independent random variables uniformly distributed on T={t}, a[τ] represents a matrix of values resulting from application of the basis functions at time τ to the one or more input samples corresponding to the pseudo randomly selected observed output sample, e[τ] is input/output mismatch in the observed data between an output of an observer receiver and the output of the digital compensator, ρ>0 is a regularization constant, and α>0 is a value representative of the step size, such that $\alpha(\rho+|a[t]|^2)<A$ for every t∈T, where A is some pre-specified constant value.

13. The system of claim 12, wherein the adaptation module is further configured to:
adjust the value of α representative of the step size based on a measure of progress of the stochastic gradient process, wherein the measure of progress is determined by comparing an average values of $|e[\tau_k]|$ and $|e[\tau_k]-a[\xi_k]\tilde{x}_k|$.

14. The system of claim 10, wherein the adaptation module is further configured to:
  repeat the pseudo-random buffer selection process to select a subsequent at least one buffer location to access a different at least one observed output sample from the selection buffer, and compute updated values for the compensator coefficients based, at least in part, on the different at least one observed output sample.

15. The system of claim 10, wherein the adaptation module configured to replace, at the time instance determined independently of the pseudo-random buffer selection process, the content of the at least the portion of the selection buffer is configured to:
  replace the content of the at least the portion of the selection buffer based on one or more of: i) receipt of a replacement signal indicating availability of the different one or more replacement observed output samples responsive to the one or more other input samples, ii) scheduled arrival of the different one or more replacement observed output samples responsive to the one or more other input samples, or iii) unscheduled arrival at an arbitrary time instance of the different one or more replacement observed output samples responsive to the one or more other input samples.

16. The system of claim 10, wherein the adaptation module configured to replace the at least the portion of the selection buffer is further configured to:
  flush the at least the portion of the selection buffer storing the plurality of observed output samples; and
  fill the at least the portion of the flushed selection buffer with the different one or more replacement observed output samples responsive to the one or more other input samples.

17. The system of claim 10, wherein the adaptation module configured to replace the at least the portion of the selection buffer is configured to:
  replace according to the pseudo-random replacement process the entire selection buffer storing the plurality of observed output samples, with a different set of observed output samples, corresponding to a different set of input samples provided to the digital compensator.

18. The system of claim 10, further comprising a communication module configured to perform one or more of:
  communicate the output signal of the signal chain to a remote device via one or more of: a wired communications interface, or a wireless communication interface, or
  receive the input signal via one or more of: the wired communications interface, or the wireless communication interface.

19. A non-transitory machine-readable medium storing a design structure comprising elements that, when processed in a computer-aided design system, generate a machine-executable representation of a linearization system that is used to fabricate hardware comprising:
  a selecting circuit to select at least one location of a selection buffer, the selection buffer storing a plurality of observed output samples obtained from one or more of output batches produced by a signal chain, according to a pseudo-random buffer selection process, and access at least one observed output sample, wherein the at least one observed output sample is generated in response to corresponding one or more input samples provided to a digital compensator applying to one or more input batches a plurality of basis functions, weighed by compensator coefficients, to produce intermediary samples, with the one or more intermediary samples provided to the signal chain;
  a computing circuit to compute an approximation of a sub-gradient value computed according to a stochastic gradient process to derive a sub-gradient of an error function representing a relationship between the accessed at least one observed output sample stored in the pseudo randomly selected at least one location of the selection buffer, and at least one of: the corresponding one or more or more input samples, or one or more intermediate samples, produced by the digital compensator, corresponding to the pseudo randomly selected at least one location of the selection buffer storing the at least one observed output sample;
  a second computing circuit to compute updated values for the compensator coefficients based on current values of the compensator coefficients and the computed approximation of the sub-gradient value computed according to the sub-gradient of the error function; and
  a replacing circuit to replace, at a time instance determined independently of the pseudo-random buffer selection process, content of at least a portion of the selection buffer with different one or more observed output samples responsive to one or more other input samples.

20. The machine-readable medium of claim 19, wherein the design structure comprises further elements that, when processed in the computer-aided design system, generate a machine-executable representation of the linearization system that is used to fabricate hardware further comprising:
  a communication circuit to perform one or more of:
    communicate the output signal of the signal chain to a remote device via one or more of: a wired communications interface, or a wireless communication interface, or
    receive the input signal via one or more of: the wired communications interface, or the wireless communication interface.

\* \* \* \* \*